United States Patent
Le et al.

(10) Patent No.: US 11,502,726 B2
(45) Date of Patent: Nov. 15, 2022

(54) COAXIAL CABLE POWER SIGNAL DISTRIBUTION SYSTEMS AND METHODS

(71) Applicant: Alpha Technologies Services, Inc., Bellingham, WA (US)

(72) Inventors: Thanh Le, Ferndale, WA (US); Joseph Daniel Vignola, North Port, FL (US); Pankaj H. Bhatt, Bellingham, WA (US)

(73) Assignee: Alpha Technologies Services, Inc., Bellingham, WA (US)

( * ) Notice: Subject to any disclaimer, the term of this patent is extended or adjusted under 35 U.S.C. 154(b) by 203 days.

(21) Appl. No.: 16/919,917

(22) Filed: Jul. 2, 2020

(65) Prior Publication Data

US 2021/0006296 A1 Jan. 7, 2021

Related U.S. Application Data

(60) Provisional application No. 62/870,582, filed on Jul. 3, 2019.

(51) Int. Cl.
 *H04B 3/54* (2006.01)
 *H04B 3/44* (2006.01)

(52) U.S. Cl.
 CPC .............. *H04B 3/548* (2013.01); *H04B 3/44* (2013.01); *H04B 3/544* (2013.01)

(58) Field of Classification Search
 CPC .......... H04B 3/548; H04B 3/44; H04B 3/544; H02J 1/084; H02J 1/06; H02J 1/102
 See application file for complete search history.

(56) References Cited

U.S. PATENT DOCUMENTS

| | | | | |
|---|---|---|---|---|
| 3,987,240 A | * | 10/1976 | Schultz | H04B 3/44 |
| | | | | 725/150 |
| 2002/0025788 A1 | * | 2/2002 | Nitta | H03G 3/3036 |
| | | | | 455/91 |
| 2002/0153778 A1 | * | 10/2002 | Oughton, Jr. | H02M 5/458 |
| | | | | 307/64 |
| 2018/0188072 A1 | * | 7/2018 | Barnett, Jr. | G01D 4/004 |
| 2020/0185961 A1 | * | 6/2020 | Ye | H02J 1/04 |
| 2020/0259336 A1 | * | 8/2020 | Rao | B60L 53/60 |

FOREIGN PATENT DOCUMENTS

| | | |
|---|---|---|
| JP | H10135681 A | 5/1998 |
| JP | 6072460 B2 | 2/2017 |

OTHER PUBLICATIONS

International Search Report dated Sep. 18, 2020 for PCT Patent Application No. PCT/2020/040687.

* cited by examiner

*Primary Examiner* — Khanh C Tran
(74) *Attorney, Agent, or Firm* — Volpe Koenig

(57) ABSTRACT

Systems, methods and devices for a coaxial cable transmission system. A power supply receives a primary power signal from a power source. The power supply generates a switched direct current power signal from the primary power signal. A power gateway receives the switched direct current power signal over a coaxial cable from the power supply. The power gateway generates a secondary power signal from the switched direct current power signal. A load device receives the secondary power signal from the power gateway. In some implementations, the power supply generates the switched direct current power signal at a positive direct current voltage level for a first part of a time period and at a negative direct current voltage level for a second part of the time period.

16 Claims, 15 Drawing Sheets

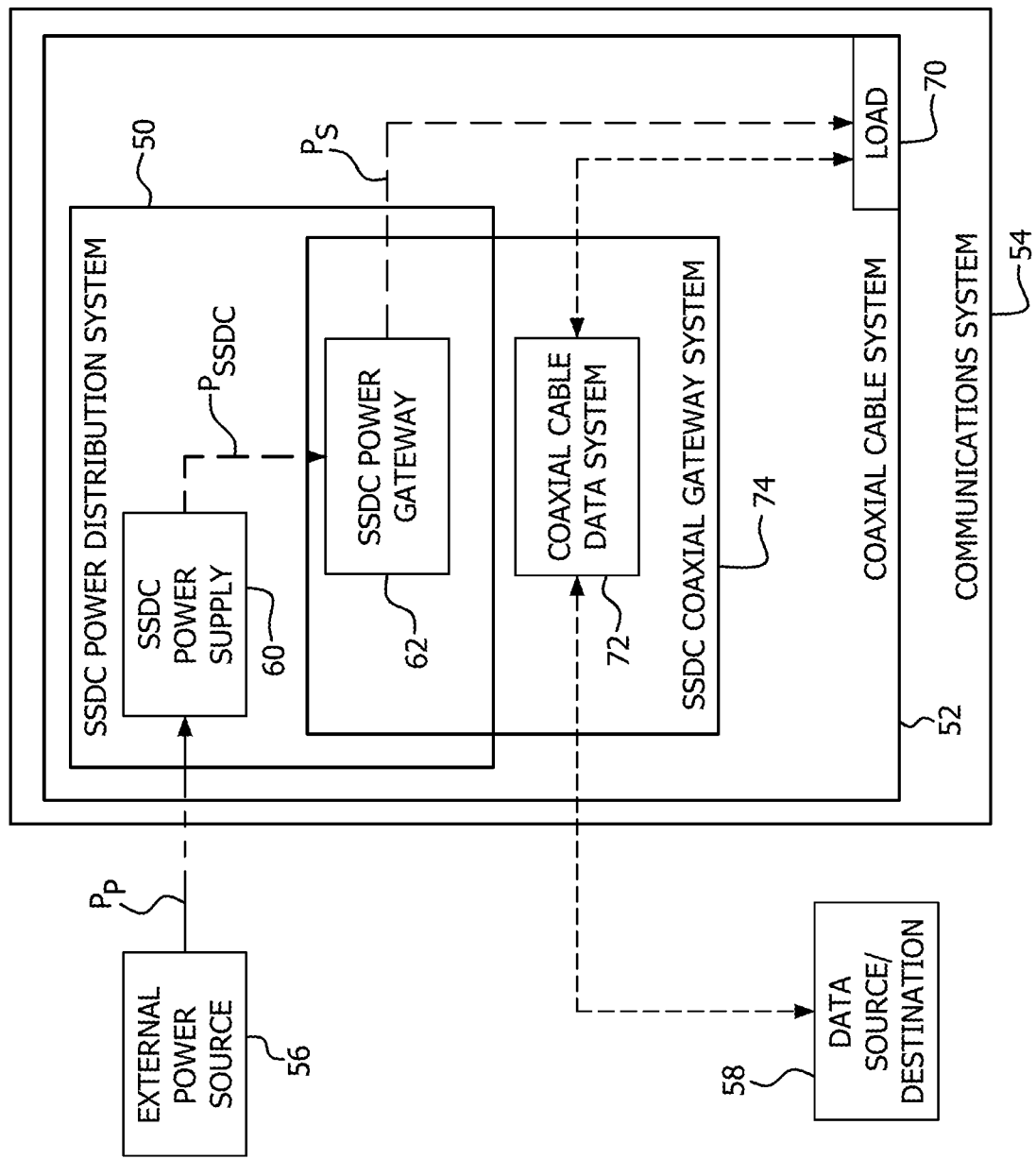

COAXIAL CABLE POWER SIGNAL DISTRIBUTION SYSTEMS AND METHODS

CROSS REFERENCE TO RELATED APPLICATIONS

This application claims the benefit of U.S. provisional application No. 62/870,582 filed on Jul. 3, 2019, which is incorporated by reference as if fully set forth.

FIELD OF INVENTION

The present invention relates to the distribution of electrical power using existing coaxial cable signal distribution systems.

BACKGROUND

Coaxial cable is typically used to transmit communications signals. As one example, coaxial cable has long been used to distribute cable television (CATV) signals from a CATV headend to end user premises. In another example, coaxial cable is used to transmit communications signals between end user premises and communications networks, such as the Internet.

BRIEF DESCRIPTION OF THE DRAWINGS

FIG. 2 is a block diagram illustrating a second example SSDC power distribution system for providing power from an external power source to a load of a coaxial cable data communications system;

DETAILED DESCRIPTION OF THE PREFERRED EMBODIMENTS

Figure 1:
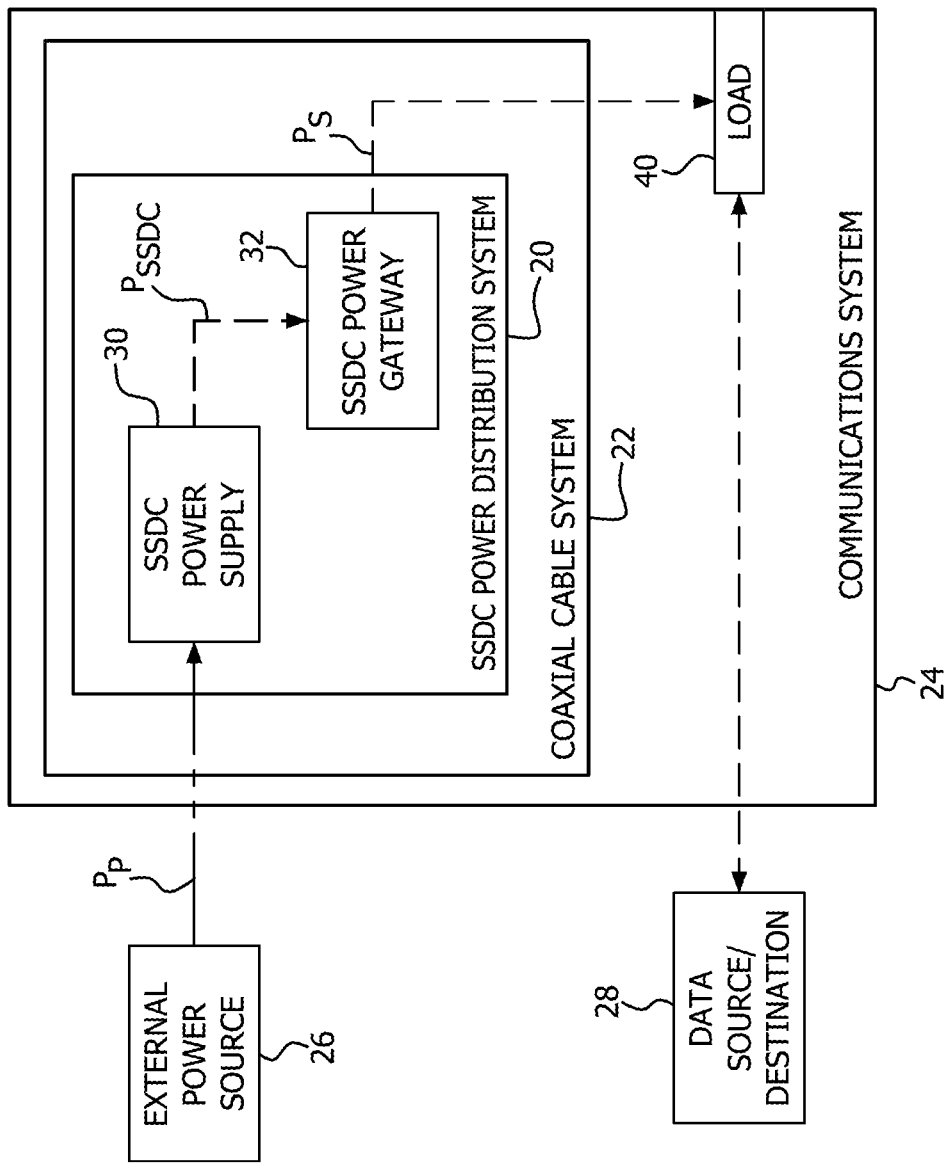
FIG. 1 is a block diagram illustrating a first example synchronous switched direct current (SSDC) power distribution system for providing power from an external power source to a load of a data communications system.

Conventional coaxial cable systems (or portions thereof) typically carry both a communications signal and an alternating current (AC) power signal. The AC power signal has conventionally been used to provide power to network components such as line extending amplifiers configured and located to maintain the integrity of the communications signal. Typically, the power signal is removed before the communications signal reaches end user premises.

Access to such AC power signal-carrying coaxial cable systems is typically widely available in areas with appreciable population density. Because access to coaxial cables carrying an AC power signal is widespread, AC power signals carried by coaxial cable systems are currently used to power devices other than network components of the coaxial cable system. For example, non-network devices, such as cameras, may be connected to a coaxial cable system such that the non-network device is powered by the AC power signal, and data is transmitted to and from the non-network device, through the coaxial cable.

Coaxial cable systems are often operated in conjunction with other wired, fiber optic, and/or wireless communications networks. For example, data may be transmitted between two separate devices over any combination of coaxial cable, fiber optic cable, telephony cable, cellular wireless system, and/or Wi-Fi wireless system. As one example, in a hybrid fiber-coaxial (HFC) system, data may be carried from a headend to an end user over fiber optic cable to a fiber node and then from the fiber node over coaxial cable to the end user's premises. In another example, data may be carried over a coaxial cable system to a Wi-Fi router or other wireless communications device, and then wirelessly to an end user device. Because the device that converts the data to or from a coaxial cable communications signal (e.g., the Wi-Fi router) is physically connected to the coaxial cable system, power to the conversion device may be obtained from the coaxial cable AC power signal. The operator of the conversion device thus need not obtain power for the conversion device from a utility power source. Because of the availability of power signal-carrying coaxial cable systems, it may be desired to provide improved coaxial cable power distribution systems, devices, and methods. Such systems, devices, and methods may be implemented in different forms. Various example implementations follow, which are illustrative. It is noted that various modifications and permutations of these examples are possible and contemplated.

Some implementations provide a synchronous switched direct current power distribution system.

Some implementations provide a coaxial cable transmission system. A power supply receives a primary power signal from a power source. The power supply generates a switched direct current power signal from the primary power signal. A power gateway receives the switched direct current power signal over a coaxial cable from the power supply. The power gateway generates a secondary power signal from the switched direct current power signal. A load device receives the secondary power signal from the power gateway.

In some implementations, the power supply generates the switched direct current power signal at a positive direct current voltage level for a first part of a time period and at a negative direct current voltage level for a second part of the time period. In some implementations, the power supply generates the switched direct current power signal at a first direct current voltage level for a first part of a time period and at a second direct current voltage level for a second part of the time period. In some implementations, the first direct current voltage level and second direct current voltage level are optimized for energy density in view of at least one constraint. In some implementations, the constraint comprises a network topology or a voltage limit. In some implementations, the switched direct current power signal is optimized to avoid corrosion of the coaxial cable. In some implementations, the power supply switches the switched direct current power signal between a first direct current voltage level and a second direct current voltage level on a predetermined schedule. In some implementations, the power supply and the power gateway are synchronized such that the power gateway adapts to a change in the switched direct current power signal. In some implementations, the power gateway adapts to the change in the switched direct current power signal from a first voltage to a second voltage in response to a synchronization signal. In some implementations, the power gateway receives the synchronization signal from another power supply. In some implementations, the power supply switches the switched direct current power signal between a first direct current voltage level and a second direct current voltage level based on a synchronization signal. In some implementations, the switched direct current power signal comprises a periodic, non-sinusoidal waveform, a pulse wave, and/or has a duty cycle of 50%. The duty cycle may not be exactly 50% once in a while in order to make adjustment to the environment to minimize the corrosion effect.

In some implementations, the coaxial cable transmission system includes a power management device and a second power supply. The power management device directs the switched direct current power signal from the power supply to the second power supply in response to a fault in the second power supply. In some implementations, the coaxial cable transmission system includes a power bus. The power supply and the second power supply are operatively connected to the power bus. The power management device directs the switched current power signal from the power supply to the second power supply over the bus if there is a fault in the second power supply. In some implementations, the coaxial cable transmission system includes a second load device. The power management device directs the switched direct current power signal from the power supply to the second load if there is a fault in the second power supply.

Some implementations provide a power gateway device. The power gateway device includes circuitry which receives a synchronous switched direct current power signal over a coaxial cable from a power supply. The power gateway device also includes circuitry which generates a secondary power signal from the synchronous switched direct current power signal. The power gateway device also includes circuitry which transmits the secondary power signal to a load device.

In some implementations, the power gateway device receives the switched direct current power signal at a first direct current voltage level for a first part of a time period and receives the switched direct current power signal at a second direct current voltage level for a second part of the time period. In some implementations, the first direct current voltage level, the first part of the time period, the second direct current voltage level, and the second part of the time period, are optimized to avoid corrosion of the coaxial cable. Some implementations provide a method implemented in a power gateway device. The method includes receiving a synchronous switched direct current power signal over a coaxial cable from a power supply, generating a secondary power signal based on the synchronous switched direct current power signal, and transmitting the secondary power signal to a load device. In some implementations, the method includes receiving the switched direct current power signal at a first direct current voltage level for a first part of a time period and receiving the switched direct current power signal at a second direct current voltage level for a second part of the time period, wherein the first direct current voltage level, the first part of the time period, the second direct current voltage level, and the second part of the time period, are set to avoid corrosion of the coaxial cable.

FIG. 1 illustrates an example synchronous switched direct current (SSDC) power distribution system 20. SSDC power distribution system 20 is part of a coaxial cable system 22 and is further part of a communications system 24. Power to SSDC power distribution system 20 is provided by one or more external power sources 26. The example communications system 24 is configured to communicate data with a data source/destination 28. Data source/destination 28 may include any device capable of transmitting and receiving data, such as a small cell or 5G radio access node. The data source/destination 28 may be part of or separate from the communications system 24.

SSDC power distribution system 20 includes an SSDC power supply 30 and an SSDC gateway 32. Communications system 24 includes a load 40. Load 40 may include any device capable of transmitting and receiving data, such as a small cell or 5G radio access node, an optical node, and/or a physical layer (PHY) device. Data is transmissible between the data source/destination 28 and the load 40 through any suitable wireless, wired, and/or fiber optic data transmission system.

The SSDC power supply 30 is operatively connected to the external power source 26 and to the SSDC power gateway 32. The SSDC power gateway 32 is operatively connected to the load 40. A primary power signal PP is transmitted from the external power source 26 and the SSDC power supply 30. A secondary power signal PS is transmitted from the SSDC power gateway 32 to the load 40.

An SSDC power signal PSSDC is transmitted by the SSDC power supply 30 to the SSDC power gateway 32 over a coaxial cable of the coaxial cable system 22.

As discussed herein, a power signal is or includes an electrical or electromagnetic signal which primarily delivers power, whereas a data signal primarily delivers information.

The primary power signal PP may include any electrical signal capable of transmitting electrical power to the SSDC power supply 30. Typically, the primary power signal PP will be a utility power signal but may be generated based on any suitable power input, such as one or more of a utility power signal, a power signal generated by alternate source such as a solar panel system or a generator, or a standby signal generated based on energy stored in a battery system. The primary power signal PP is typically an AC power signal operating at a standard voltage and frequency, such as 120 or 240 volts AC at 60 Hz, however in some implementations, primary power signal PP is a DC power signal, or any suitable power signal.

The secondary power signal PS is power signal as appropriate for powering the load 40. In particular, the load 40 may be configured to normally operate on standard utility power, in which case the secondary power signal PS will have the same characteristics as a utility power signal. Alternatively, the load 40 may be configured to operate based on a DC voltage at one or more predetermined levels or a non-standard AC voltage. The SSDC power gateway 32 is configured to generate the appropriate secondary power signal based on the SSDC power signal as will be described in further detail below.

In some implementations, the secondary power signal PS has characteristics that are substantially the same as, or similar to, the primary power signal PP. For example, in some implementations the external power source 26 provides primary power signal PP as typical mains power of 120 volts AC at 60 Hz to SSDC power supply 30, and SSDC power gateway 32 provides secondary power signal PS of 120 volts AC at 50/60 Hz from PSSDC, the output of SSDC power supply 30. In other implementations, the secondary power signal PS has characteristics different from the primary power signal PP. For example, in some implementations the external power source 26 provides primary power signal PP as typical mains power of 120/240 volts AC at 60 Hz to SSDC power supply 30, and SSDC power gateway 32 provides secondary power signal PS as a UPS AC input to a load configured to operate with universal utility input between 90-264 volts AC at 50/60 Hz from PSSDC, the output of SSDC power supply 30.

The SSDC power signal PSSDC is a synchronous switched DC (SSDC) power signal. In particular, the SSDC power signal PSSDC is a signal that operates, over a time period, at a first DC voltage level for part of the time period and at a second DC voltage level for a different part of the time period. In some implementations, the first and second DC voltage levels are positive and negative, respectively.

In some implementations, the SSDC power signal PSSDC has a periodic waveform where the amplitude alternates at a steady frequency between fixed minimum and maximum values. In some implementations, the periodic waveform is non-sinusoidal (except to the extent that it may exhibit transient oscillation or "ringing" following a transition). Such waveform is referred to as non-sinusoidal herein, regardless of any incidental non-ideal behavior due to under-damping or ringing, etc. In some implementations, the waveform includes or approximates a pulse wave or a square wave.

In some implementations, SSDC power supply 30 and the SSDC power gateway 32 are synchronized such that the SSDC power gateway 32 adapts to the changes in the SSDC power signal PSSDC. For example, in some implementations, SSDC power gateway 32 adapts to the changes in the SSDC power signal PSSDC by converting the SSDC power signal PSSDC to generate secondary power signal PS as an input power signal needed by load 40. In some implementations, SSDC power gateway 32 adapts to the changes in the SSDC power signal PSSDC by regulating and conditioning secondary power signal PS responsive to plant IR drop.

The first and second voltage levels are determined in advance, in real time, and/or based on network topology to optimize energy density. In some implementations, the first and second voltage levels are optimized for energy density by setting them to the highest voltage allowed by a relevant regulatory agency. While higher voltages are desired to optimize energy density, industry standards and regulations may limit the voltage levels selected for a particular coaxial cable system 22 and/or communications system 24. The first level of the example SSDC power signal PSSDC may be, for example, +150 or 300 volts DC, while the second level of the example SSDC power signal PSSDC may be, for example −150 or 300 volts DC.

The synchronization between the SSDC power supply 30 and the SSDC power gateway 32 may be based on a predetermined schedule (e.g., 12 AM and 12 PM each day), in which the SSDC power supply 30 and the SSDC power gateway 33 each have access to a clock capable of accurately maintaining the predetermined schedule. The synchronization between the SSDC power supply 30 and the SSDC power gateway 32 may also be based on a master/slave arrangement, in which case the SSDC power supply 30 and the SSDC power gateway 32 are in data communication such that one of the SSDC power supply and the SSDC power gateway 32 (master) sends a synchronization signal to the other of the SSDC power supply and the SSDC power gateway 32 (slave) to control switching between the first and second DC voltage levels. In some implementations, the power supply turns the gateway on and/or off remotely per system requirements (e.g., due to load shedding, authorization, synchronization, etc.) or otherwise manages the gateway. In some implementations, SSCD power supply 30 receives the status of the gateway and determines how to manage the gateway based on the received status.

In some implementations, a predetermined SSDC power supply 30 will function as the master to one or more other SSDC power supplies 30 and one or more SSDC power gateways 32. As another example, both the SSDC power supply 30 and the SSDC gateway 32 may be controlled based on a synchronization signal generated by another component of the SSDC power distribution system 20, the coaxial cable system 22, or the communications system 24.

Permutations or hybrids of these various synchronization schemes may also be used. For example, a synchronization signal may be generated periodically (e.g., monthly) or asynchronously (e.g., upon detection of a fault), at which point the SSDC power supply 30 and SSDC gateway operate based on a predetermined schedule until the next synchronization signal is generated.

In some implementations, the duration during which the SSDC power signal PSSDC remains at the first and second voltage levels are such that corrosion of the components of the coaxial cable system 22 is minimized, reduced or eliminated as compared with other durations, possibly within certain constraints. For example, coaxial cables, splitters, taps, connectors, and the like are all susceptible to corrosion when carrying a DC power signal for long periods of time. Switching between the first and second levels will reduce or eliminate such corrosion. In some implementations, switching between the first and second levels every twelve hours is sufficient to inhibit corrosion of the cable system components, but other periods may be selected based on factors such as the particular configuration of the coaxial cable system 22, the environmental conditions in which the coaxial cable system 22 operates, regulatory and/or standards constraints, etc. In some implementations, corrosion occurs due to the grounding of the sheath (the outer jacket of the coaxial cable), e.g., at every pole, creating a parallel path of the neutral current, sheath conductor and earth ground conductor. In some implementations, this parallel path of earth ground conductor causes the sheath conductor material to migrate to earth ground, causing material loss as a corrosive effect, similar to PCB plating. In some implementations, the voltage levels and/or switching timing are selected to prevent, reduce, minimize, or optimize such corrosion. In some implementations, the rate of material flow depends on the voltage amplitude, the earth ground impedance, the material mass, the frequency of polarity switching and/or weather conditions, etc. In some implementations, the voltage levels are determined based on regulatory requirements. In some implementations, the switching frequency and/or switching timing is determined based on soil impedance and/or a size and/or mass of metal (e.g., copper) and/or other material properties or specifications of the coaxial cable and/or coaxial cable network, including its environment.

In this example, the SSDC power signal PSSDC is held at the first and second levels for equal periods of time (e.g., 12 hours), however in some implementations, an SSDC power signal PSSDC may be held at the first and second levels for unequal or varying time periods. For example, the SSDC power signal PSSDC may be held at the first level for 12 hours and then at the second level for 8 hours. As another example, the SSDC power signal PSSDC may be held at the first and second levels for equal durations for a first period of time and then held at the first and second levels for unequal durations for a second period of time.

Figure 1A:
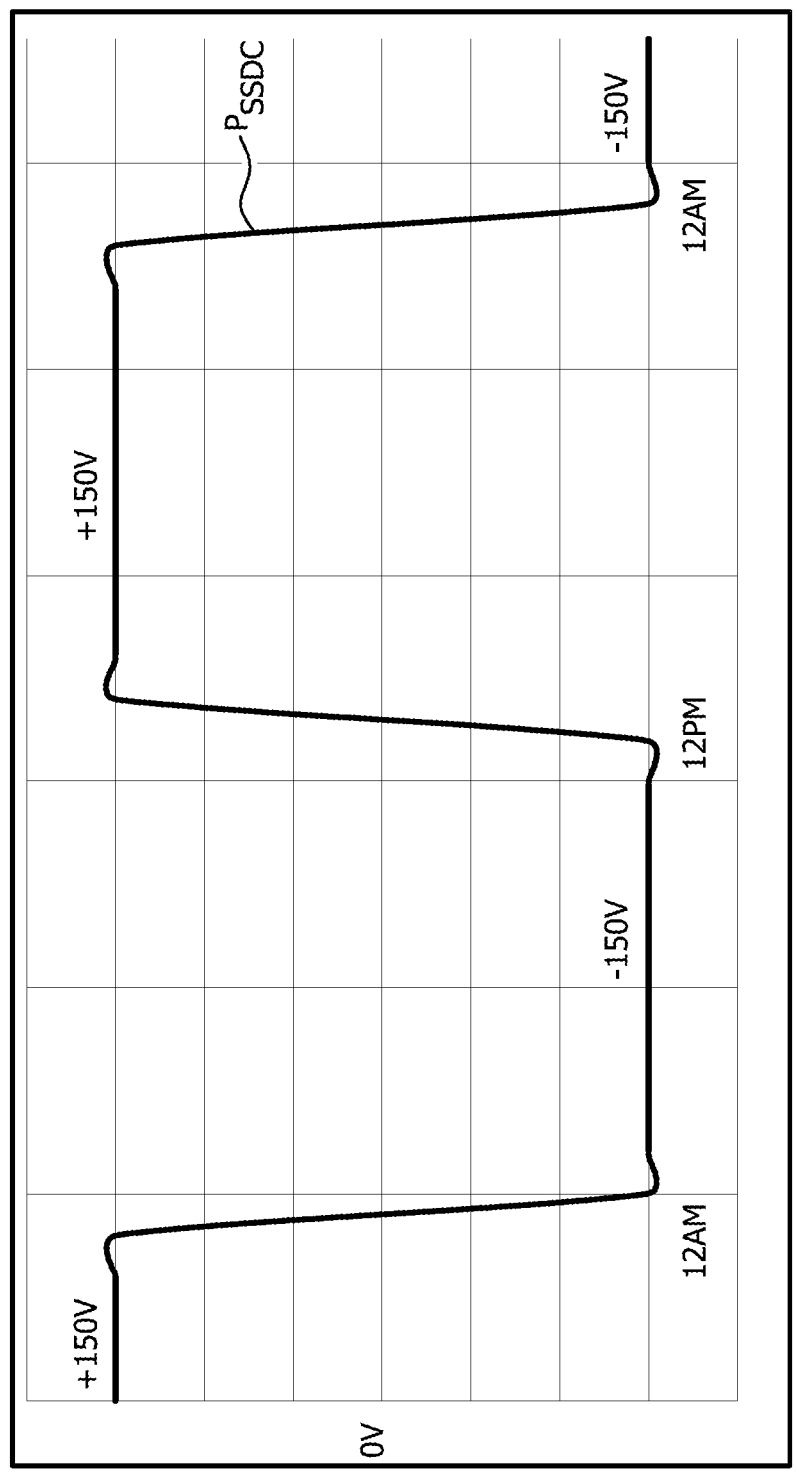
FIG. 1A is a timing diagram of an example synchronous switched DC power supply generated during operation of the first example SSDC power distribution system.

FIG. 1A is a timing diagram illustrating an example SSDC power signal PSSDC generated by SSDC power supply 30 based on the primary power signal PP and which is used by the SSDC power gateway 32 to generate the secondary power signal PS. The example SSDC power signal PSSDC depicted in FIG. 1A switches from +150V to −150V every day at 12 AM and switches from −150V to +150V every day at 12 PM. This synchronization may be maintained by separate free-running clocks, by a synchronization signal sent by either of the SSDC power supply 30 or the SSDC power gateway 32, and/or by a synchronization signal generated by another component of the SSDC power distribution system 20, the coaxial cable system 22, or the communications system 24.

The load 40 may be or form a part of a residential service including one or more of DTV/STB services, cable modem services, Wi-Fi services, and/or telephone services. The load 40 may also be or form a part of a commercial service including one or more of cable modem services, security systems, IP/PBX systems, and/or point of sale services. The load 40 may also be or form a part of a physical layer (e.g., OSI MODEL—Layer 1) for implementing basic functions (e.g., Tx/Rx, modulations, signals) of a data communications system. Other examples of loads that may form the load 40 include Wireless AP (e.g., Wi-Fi, Lora Gateway, LTE-M, NB-IoT, and Zigbee), surveillance cameras, small cells (e.g., 4G and/or 3G cellular), 5G cellular, remote physical layer (PHY), data backhaul gateways, outdoor remote utility power analyzers and/or sensors, etc.

In some implementations, an SSDC power supply provides PSSDC at a particular power density. In some implementations, an SSDC power supply provides PSSDC at a power density greater than (e.g., 4× greater than) a typical broadband power cabinet. In some implementations, SSDC power supply 30 includes power supply modules, redundant hardware, environmental controls, surge suppression hardware, cooling and/or heating equipment, efficiency enhancements, energy storage system (ESS) hardware, one or more input AC/DC converters, power factor correction (PFC) circuitry, one or more DC/AC and/or DC/DC converters, communications hardware (e.g., modem, human-machine interface, computer communications interface, software defined communication network interface, etc.), and/or time of use (TOU) system (e.g., for storing energy generated at non-peak demand times to be used during peak demand times).

In some implementations, SSDC power supply 30 is configured to provide PDSSC at a power density of 6 kilowatts per cabinet per pole. In some implementations, SSDC power supply 30 includes active high frequency switched mode power supply modules, N+1 redundancy to facilitate reliability of active SMPS components, an environmentally controlled cabinet, an industrial surge suppressor, active cooling configured to facilitate Lithium-ion battery operation, e.g., in a 60 degree Celsius environment, active heating configured to facilitate Lithium-ion battery operation, e.g., in a −40 degree Celsius environment, an 1 phase input voltage of 240 volts AC for power factor corrected (PFC) operation, a 3 phase input voltage of 480 volts AC for non-PFC operation, an interleaved and/or bridgeless PFC, a bidirectional input module, e.g., configured to provide energy in any suitable configuration, such as to an energy storage system (ESS), an output of 150 or 300 volts SSDC, e.g., at 6 kilowatts, An output of 150 or 300 volts using a SSDC gateway for North America, a SSDC inductor-inductor-capacitor (LLC) converter, and/or SSDC phase-shift full bridge (PSFB) converter, e.g., at 1.5-2 kilowatts, communications hardware, such as a modem (e.g., Data Over Cable Service interface Specification (DOCSIS), Coaxial Power Line Communication, LoRa™, or other standard) human-machine interface, e.g., via smartphone, e.g., interfaced via Bluetooth™ or other standard, remotely uploadable/upgradable firmware, TOU capability, an ESS (e.g., 15 kilowatt-hours) or facility to include such an ESS, and/or an interface for a software-defined communication network, e.g., for power control.

In some implementations, a power supply (e.g., SSDC power supply 30) may include or facilitate a battery management system. In some implementations, such battery management system includes a scalable DC/DC non-isolated buck/boost converter, a bidirectional DC/DC converter, batteries, a battery management module, upgradable firmware, ESS circuitry, and/or communications hardware.

In some implementations, the scalable DC/DC non-isolated buck/boost converter includes a lithium battery, e.g., a 36 cell in series lithium pack scalable for various power requirements, such as 2, 4, and 6 kilowatts. In some implementations, the bidirectional DC/DC converter includes a dual-active bridge (DAB) and/or a 48 volt battery pack. In some implementations, suitable batteries include a 131 VDC 5 KWH lithium-ion pack, e.g., scalable to 3 packs for 393 VDC, 15 KWH, a 48 VDC lithium-ion pack, e.g., scalable to 3 packs, and/or 48 VDC valve regulated lead acid (VRLA) string, e.g., with a 3 string parallel maximum. In some implementations, the firmware is remotely downloadable. In some implementations, the ESS has a 15 kilowatt-hour capacity. In some implementations, the communications hardware includes an interface for a software defined communications network.

Example specifications for a battery system for use in SSDC power supply 30 are as follows:

TABLE 1

| Specification | Value | Unit |
|---|---|---|
| Module Voltage Nom | 132.48 | V |
| Module maximum Voltage | 151.20 | V |
| Module minimum Voltage | 108.00 | V |
| Module AH Rating | 39 | AH |
| Module Maximum Continuous Rated Current | 39 | A |
| Maximum Modules in Series | 36 | cells |
| Module Nominal Energy | 4.90 | kWh |
| Maximum Depth | 406 | mm |
| Maximum Width | 228 | mm |
| Maximum Height | 400 | mm |
| Temperature Range | −40 to +60 | ° C. |

In some implementations, cell characteristics for the example battery system are based on the AA-18-008 Lithium ESS specification. In some implementations, the size is based on the maximum allowable pole mount cabinet (787 mmW×965 mmH×482 mmD). Some implementations include a maximum of a 3 battery in a pack (series or parallel) per cabinet, 15 kilowatt-hour minimum.

In some implementations, an input to the SSDC power gateway 32 of the present invention may include one or more of the following characteristics: DC Output: power-over-Ethernet (POE), POE++, e.g., at 12, 24, or 48 VDC, e.g., at 60, 100, 200, 300, or 400 Watts, AC Output: e.g., at 60, 90, or 120 VAC 50/60 Hz VDC at 60, or 100, Watts at 200, 300, 400, POL battery backup for higher availability or load averaging for longer reach, authentication and authorized power connection verification, status monitoring, device to device communication, load shedding and power plant management, embedded wireless AP gateways, usage metering, DOCSIS back haul, Device-to-Device Communication, e.g., using Power Line Communication (PLC) and/or a software defined communication power network interface.

FIG. 2 is a block diagram illustrating a second example SSDC power distribution system 50. The second example SSDC power distribution system 50 is part of a coaxial cable system 52 and is further part of a communications system 54. Power to the second example SSDC power distribution system 50 is provided by one or more external power sources 56. The example communications system 54 is configured to communicate data with a data source/destination 58. The data source/destination 58 may be part of or separate from the communications system 54.

The second example SSDC power distribution system 50 includes a synchronous switched direct current (SSDC) power supply 60 and an SSDC power gateway 62. The example communications system 54 includes a load 70 and a coaxial cable data system 72. In some implementations, coaxial cable data system 72 includes a DOCSIS cable modem, Wi-Fi or other wireless access point, a cellular modem, and or a LORA gateway. Data is transmitted between the data source/destination 58 and the load 70 through the coaxial cable data system 72. The example SSDC power gateway 62 and the coaxial cable data system 72 are combined as a SSDC coaxial gateway system 74 in this example, however, in some implementations an SSDC power gateway and coaxial cable data system may be separate physical equipment.

The SSDC power supply 60 is operatively connected to the external power source 56 and to the SSDC power gateway 62. The SSDC power gateway 62 is operatively connected to the load 70. A primary power signal PP is transmitted from the external power source 56 and the SSDC power supply 60. A secondary power signal PS is transmitted from the SSDC power gateway 62 to the load 70. An SSDC power signal PSSDC is transmitted by the SSDC power supply 60 to the SSDC power gateway 62 over coaxial cable of the coaxial cable system 52.

The coaxial cable data system 72 uses the coaxial cable of the coaxial cable system 52 to transmit data between the data source/destination 58 and the load 70. The SSDC power signal PP and the data transmitted between the data source/destination 58 and load 70 are thus both carried by the coaxial cable of the coaxial cable system 52. The primary power signal PP, secondary power signal PS, and SSDC power signal PSSDC are or may be the same as, or have the same characteristics as, the corresponding power signals PP, PS, and PSSDC, respectively, described above with respect to FIGS. 1 and 1A.

Figure 3:
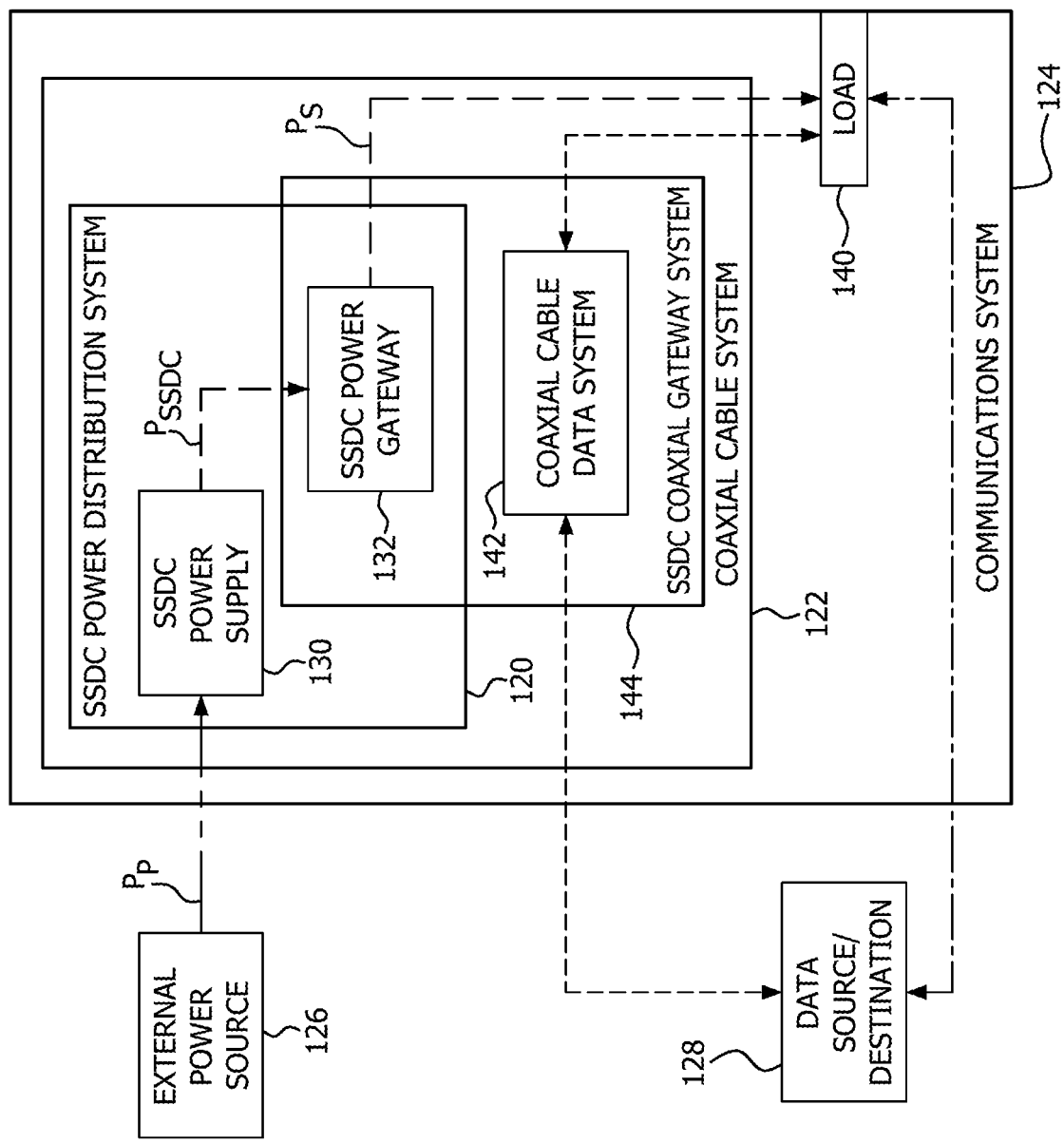
FIG. 3 is a block diagram illustrating a third example SSDC power distribution system for providing power from an external power source to a load of a hybrid data communications system.

FIG. 3 is a block diagram illustrating a third example SSDC power distribution system 120. The third example SSDC power distribution system 120 is part of a coaxial cable system 122 and is further part of a communications system 124. Power to the third example SSDC power distribution system 120 is provided by one or more external power sources 126. The example communications system 124 is configured to communicate data with a data source/destination 128. The data source/destination 128 may be part of or separate from the communications system 124.

The third example SSDC power distribution system 120 includes a synchronous switched direct current (SSDC) power supply 130 and an SSDC power gateway 132. The example communications system 124 includes a load 140 and a coaxial cable data system 142. Data is transmitted between the data source/destination 128 and the load 140 through the coaxial cable data system 142. The example SSDC power gateway 132 and the coaxial cable data system 142 may be separate physical equipment but are typically combined as a SSDC coaxial gateway system 144.

The SSDC power supply 130 is operatively connected to the external power source 126 and to the SSDC power gateway 132. The SSDC power gateway 132 is operatively connected to the load 140. A primary power signal PP is transmitted from the external power source 126 and the SSDC power supply 130. A secondary power signal PS is transmitted from the SSDC power gateway 132 to the load 140. An SSDC power signal PSSDC is transmitted by the SSDC power supply 130 to the SSDC power gateway 132 over coaxial cable of the coaxial cable system 122. In addition, data is also communicated between the data source/destination 128 and the load 140 using a data transmission other than the coaxial cable data system 142. The direct communication between the data source/destination 128 and the load 140 may be wireless, wired, and/or fiber optic.

The coaxial cable data system 142 uses both the coaxial cable of the coaxial cable system 122 and a direct data path to transmit data between the data source/destination 128 and the load 140. The SSDC power signal PSSDC and at least some of the data transmitted between the data source/destination 128 and load 140 are both carried by the coaxial cable of the coaxial cable system 122. The primary power signal PP, secondary power signal PS, and SSDC power signal PSSDC are or may be the same as the power signals PP, PS, and PSSDC, respectively, described above.

Figure 4:
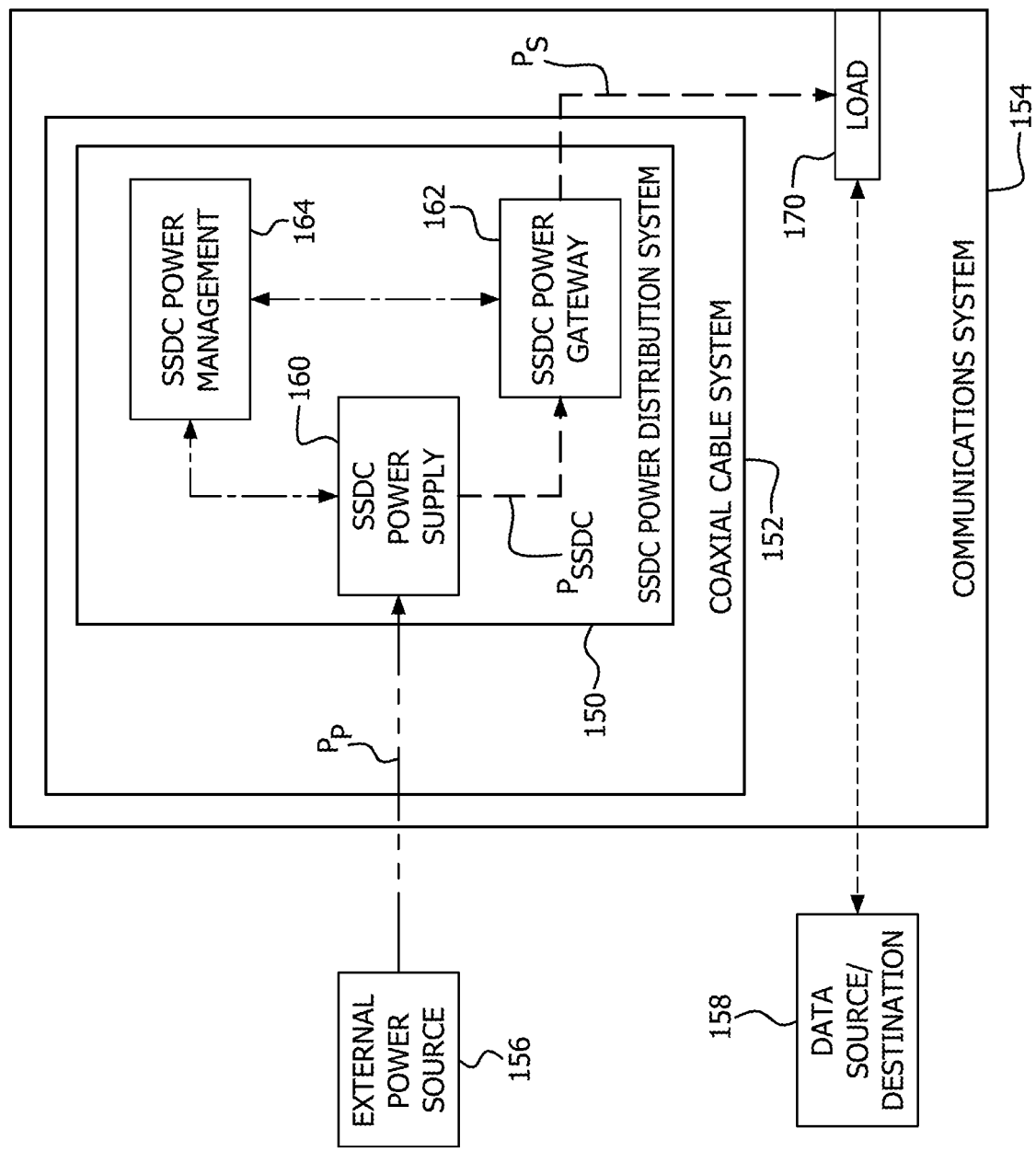
FIG. 4 is a block diagram illustrating a fourth example SSDC power distribution system for providing power from an external power source to a load of a data communications system, where the fourth example SSDC power distribution system includes a power management system.

FIG. 4 is a block diagram illustrating a fourth example SSDC power distribution system 150. The fourth example SSDC power distribution system 150 is part of a coaxial cable system 152 and is further part of a communications system 154. Power to the fourth example SSDC power distribution system 150 is provided by one or more external power sources 156. The example communications system 154 is configured to communicate data with a data source/destination 158. The data source/destination 158 may be part of or separate from the communications system 154.

The fourth example SSDC power distribution system 150 includes a synchronous switched direct current (SSDC) power supply 160, an SSDC power gateway 162, and an SSDC power management device 164. The example communications system 154 includes a load 170. Data is transmitted between the data source/destination 158 and the load 170 through any suitable wireless, wired, and/or fiber optic data transmission system.

The SSDC power supply 160 is operatively connected to the external power source 156 and to the SSDC power gateway 162. The SSDC power gateway 162 is operatively connected to the load 170. A primary power signal PP is transmitted from the external power source 156 and the SSDC power supply 160. A secondary power signal PS is transmitted from the SSDC power gateway 162 to the load 170. AN SSDC power signal PSSDC is transmitted by the SSDC power supply 160 to the SSDC power gateway 162 over coaxial cable of the coaxial cable system 152.

The SSDC power management device 164 is in data communication with both the SSDC power supply 160 and the SSDC power gateway 162. The SSDC power management device 164 is configured to coordinate operation of the SSDC power supply 160 and the SSDC power gateway 162. For example, in some implementations SSDC power management device 164 synchronizes operation of the SSDC power supply 160 and SSDC power gateway 162 and may also be configured to allow or to cause one or both of the SSDC power supply 160 and SSDC power gateway 162 to be disconnected from other components of the SSDC power distribution system 150.

Any of the example SSDC power distribution systems of the present invention may thus form a software defined, adaptable power network for a communications system.

Figure 5:
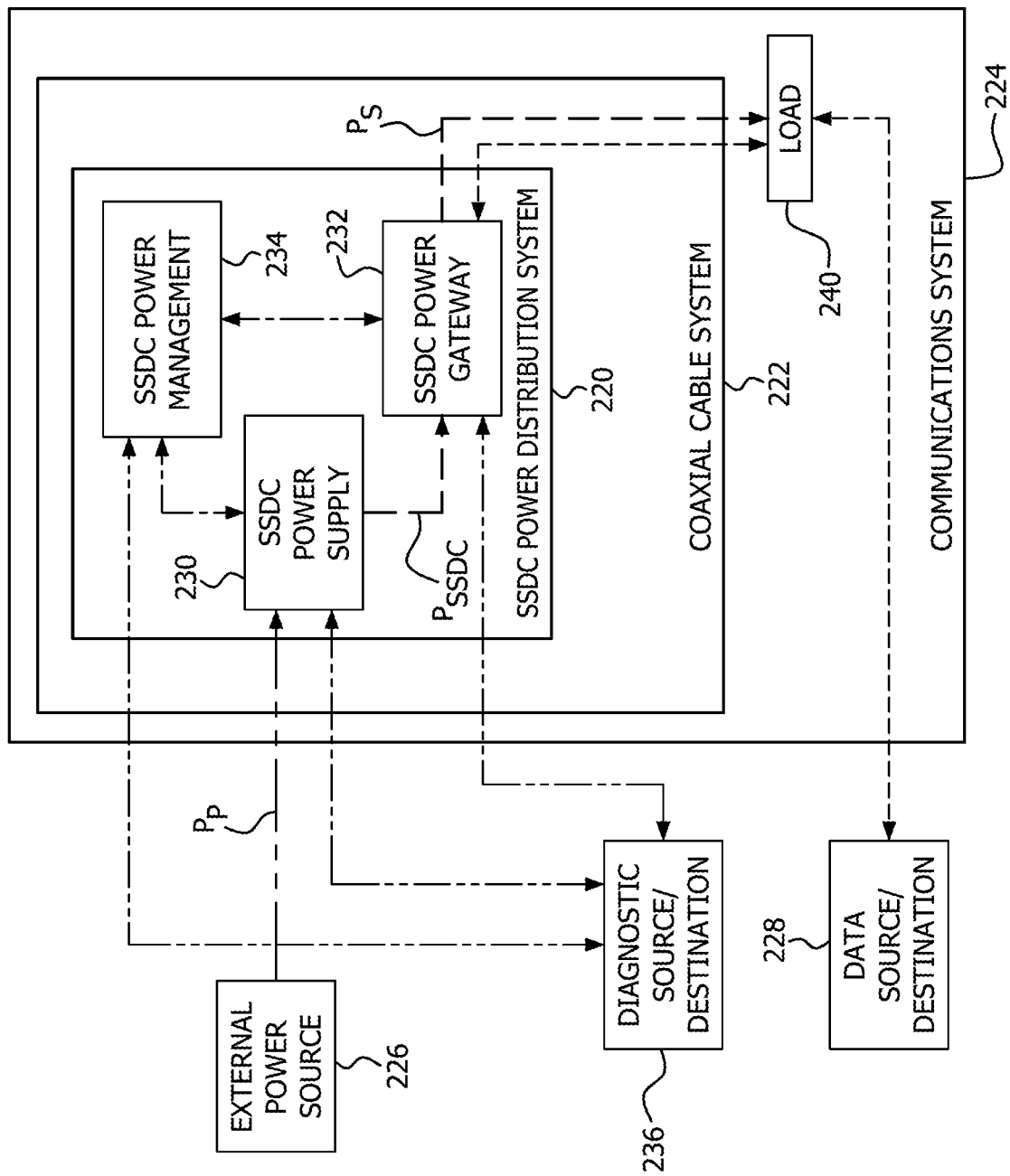
FIG. 5 is a block diagram illustrating a fifth example SSDC power distribution system for providing power from an external power source to a load of a hybrid data communications system, where the fifth example SSDC power distribution system includes a power management system.

FIG. 5 is a block diagram illustrating a fifth example SSDC power distribution system 220. The fifth example SSDC power distribution system 220 is part of a coaxial cable system 222 and is further part of a communications system 224. Power to the fifth example SSDC power distribution system 220 is provided by one or more external power sources 226. The example communications system 224 is configured to communicate data with a data source/destination 228. The data source/destination 228 may be part of or separate from the communications system 224.

The fifth example SSDC power distribution system 220 includes a synchronous switched direct current (SSDC) power supply 230, an SSDC power gateway 232, an SSDC power management module 234, and a diagnostic source/destination 236. The example communications system 224 includes a load 240. Data is transmitted between the data source/destination 228 and the load 240 through any suitable wireless, wired, and/or fiber optic data transmission system.

The SSDC power supply 230 is operatively connected to the external power source 226 and to the SSDC power gateway 232. The SSDC power gateway 232 is operatively connected to the load 240. A primary power signal PP is transmitted from the external power source 226 and the SSDC power supply 230. A secondary power signal PS is transmitted from the SSDC power gateway 232 to the load 240. An SSDC power signal PSSDC is transmitted by the SSDC power supply 230 to the SSDC power gateway 232 over coaxial cable of the coaxial cable system 222.

In the fifth example SSDC power distribution system 220, the SSDC power management module 234 is in data communication with both the SSDC power supply 230 and the SSDC power gateway 232, and the diagnostic source/destination 236 is in data communication with the SSDC power supply 230, the SSDC power gateway 232, and the SSDC power management module 234.

The SSDC power management module 234 includes any suitable hardware configured to coordinate operation of the SSDC power supply 230 and the SSDC power gateway 232. In some implementations, SSDC power management system 234 includes any hardware and/or software configured to control SSDC power system components, e.g., to maintain maximum uptime in critical neighborhoods, to control TOU based on utility rates in different areas to minimize utility costs, and/or to use power from multiple adjacent SSDC power systems to provide power to an impaired network. In this example, the example SSDC power management system 234 synchronizes operation of the SSDC power supply 230 and SSDC power gateway 232 and may also be configured to allow one or both of the SSDC power supply 230 and SSDC power gateway 232 to be disconnected from other components of the SSDC power distribution system 220.

The diagnostic source/destination 236 includes any suitable hardware and/or software configured to facilitate real-time and/or offline monitoring of the status of the various components of the example SSDC power distribution system 220. In some implementations, diagnostic source/destination 236 includes hardware and/or software configured to analyze component data from remote devices, e.g., to provide predictive life expectation for such components, to facilitate proactive maintenance to achieve maximum uptime, and/or optimized site maintenance visits. In some implementations, the functions of the SSDC power management module 234 and the diagnostic source/destination 236 are different and are performed by different software processes. In some implementations, the software process implementing the functions of the SSDC power management module 234 and of the diagnostic source/destination 236 may be implemented at a single facility and/or by the same device or system.

Figure 6:
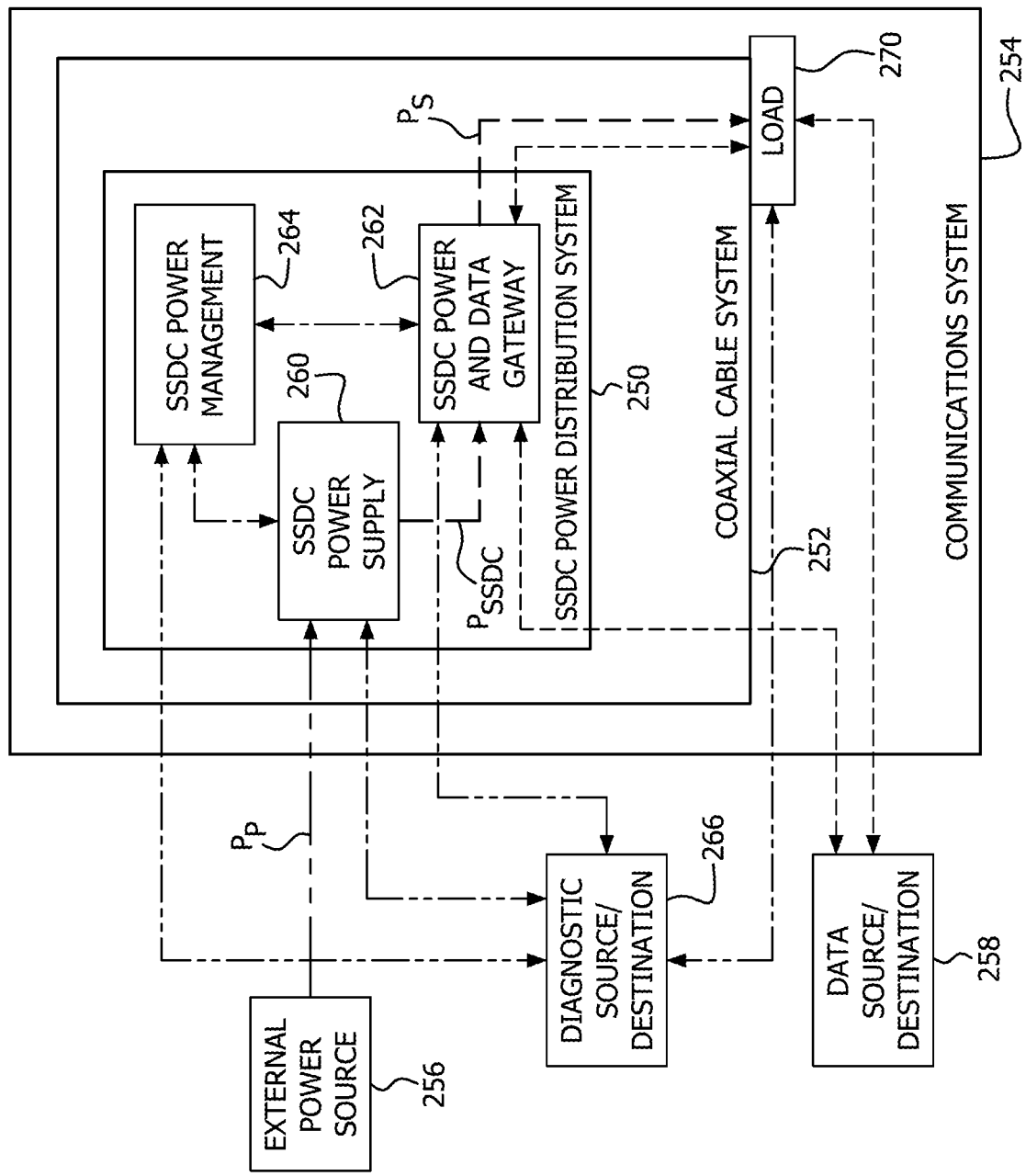
FIG. 6 is a block diagram illustrating a sixth example SSDC power distribution system for providing power from an external power source to a load of a hybrid data communications system, where the sixth example SSDC power distribution system includes a power management system and integrates with a diagnostic system.

FIG. 6 is a block diagram illustrating a sixth example SSDC power distribution system 250. The sixth example SSDC power distribution system 250 is part of a coaxial cable system 252 and is further part of a communications system 254. Power to the sixth example SSDC power distribution system 250 is provided by one or more external power sources 256. The example communications system 254 is configured to communicate data with a data source/destination 258. The data source/destination 258 may be part of or separate from the communications system 254.

The sixth example SSDC power distribution system 250 includes a synchronous switched direct current (SSDC) power supply 260, an SSDC power and data gateway 262, an SSDC power management device 264, and a diagnostic source/destination 266. The example communications system 254 includes a load 270. Data is transmitted between the data source/destination 258 and the load 270 through any suitable wireless, wired, and/or fiber optic data transmission system.

The SSDC power supply 260 is operatively connected to the external power source 256 and to the SSDC power and data gateway 262. The SSDC power and data gateway 262 is operatively connected to the load 270. A primary power signal PP is transmitted from the external power source 256 and the SSDC power supply 260. A secondary power signal PS is transmitted from the SSDC power and data gateway 262 to the load 270. An SSDC power signal PSSDC is transmitted by the SSDC power supply 260 to the SSDC power and data gateway 262 over coaxial cable of the coaxial cable system 252.

In the sixth example SSDC power distribution system 250, the SSDC power management device 264 is in data communication with both the SSDC power supply 260 and the SSDC power and data gateway 262, and the diagnostic source/destination 266 is in data communication with the SSDC power supply 260, the SSDC power and data gateway 262, and the SSDC power management device 264.

The SSDC power management device 264 coordinates operation of the SSDC power supply 260 and the SSDC power and data gateway 262. The SSDC power management device 264 coordinates operation of the SSDC power supply 260 and the SSDC power and data gateway 262. In particular, in the sixth example cable power distribution system the example SSDC power management device 264 synchronizes operation of the SSDC power supply 260 and SSDC power and data gateway 262 and may also be configured to allow one or both of the SSDC power supply 260 and SSDC power and data gateway 262 to be disconnected from other components of the SSDC power distribution system 250.

The example diagnostic source/destination 266 is connected to the load 270 in addition to the SSDC power supply 260, the SSDC power and data gateway 262, and SSDC power management device 264. The example diagnostic source/destination 266 thus allows real-time and/or offline monitoring of the status of the various components of the example SSDC power distribution system 250, the example coaxial cable system 252, and/or the example communications system 254. In practice, although the functions of the SSDC power management device 264 and the diagnostic source/destination 266 are different and will likely be performed by different software processes, the software process implementing the functions of the SSDC power management device 264 and of the diagnostic source/destination 266 may be implemented at a single facility.

Figure 7:
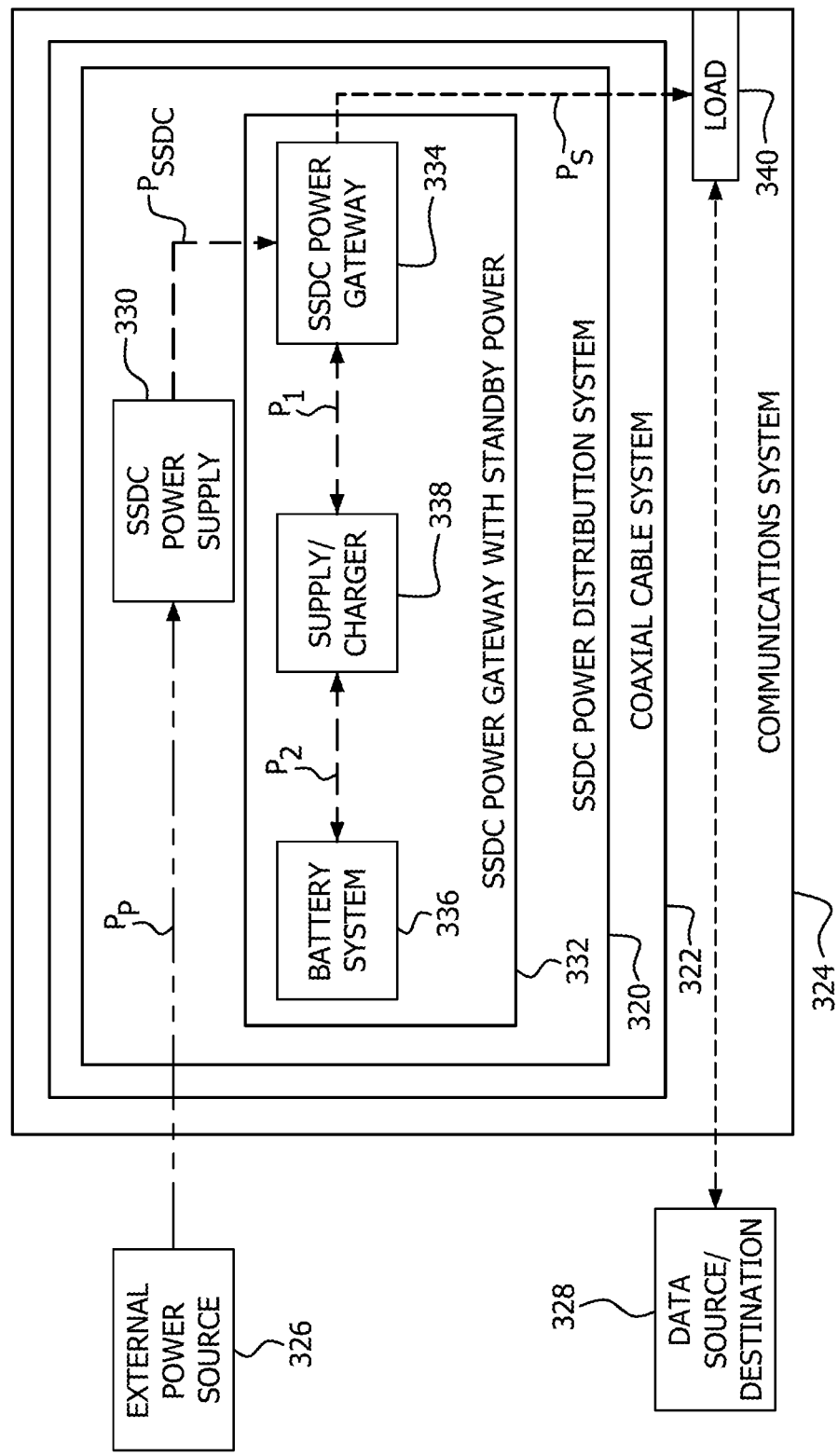
FIG. 7 is a block diagram illustrating a seventh example SSDC power distribution system for providing power from an external power source to a load of a data communications system, where the seventh example coaxial cable power system employs standby power at a power gateway level.

FIG. 7 is a block diagram illustrating a seventh example SSDC power distribution system 320 constructed in accordance with, and embodying, the principles of the present invention. The seventh example SSDC power distribution system 320 is part of a coaxial cable system 322 and is further part of a communications system 324. Power to the seventh example SSDC power distribution system 320 is provided by one or more external power sources 326. The example communications system 324 is configured to communicate data with a data source/destination 328. The data source/destination 328 may be part of or separate from the communications system 324.

The seventh example SSDC power distribution system 320 includes a synchronous switched direct current (SSDC) power supply 330 and an SSDC gateway with standby power 332. The example SSDC power gateway with standby power 332 includes an SSDC power gateway 334, an energy storage system such as a battery system 336, and a supply/charger circuit 338. The example communications system 324 includes a load 340. Data is transmitted between the data source/destination 328 and the load 340 through any suitable wireless, wired, and/or fiber optic data transmission system.

The SSDC power supply 330 is operatively connected to the external power source 326 and to the SSDC power gateway with standby power 332. The SSDC power gateway with standby power 332 is operatively connected to the load 340. A primary power signal PP is transmitted from the external power source 326 and the SSDC power supply 330. A secondary power signal PS is transmitted from the SSDC power gateway with standby power 332 to the load 340. An SSDC power signal PSSDC is transmitted by the SSDC power supply 330 to the SSDC power gateway with standby power 332 over coaxial cable of the coaxial cable system 322.

The SSDC power gateway with standby power 332 is capable of generating the secondary power signal PS based on one or both of the SSDC power signal PSSDC and a standby power signal P1 generated by the supply/charger circuit 338. The supply/charger circuit 338 further generates the standby power signal P1 based on a battery power signal P2 available at the battery system 336. The SSDC power signal PSSDC, the standby power signal P1, and the battery power signal P2 may be the same, or one or more of these signals PSSDC, P1, and P2 may be different, in which case a conversion process may be implemented by one or both of the SSDC power gateway 334 and the supply/charger circuit 338.

The standby power signal P1 may be used to supply the secondary power signal PS to the load 340 when the PSSDC power signal is outside of parameters. For example, if the PSSDC input of the SSDC power gateway is outside of its operational range (e.g., less than −20% or more than +20% of nominal. In some implementations, the standby power signal P1 facilitates the SSDC power gateway 334 in implementing power averaging, e.g., 150 or 300 Volt SSDC that allows the load 340 to operate during short periods of high demand without disrupting normal operation of the SSDC power distribution system 320. In some implementations, the power averaging includes, for cases of peak demand from multiple gateways at the same time, a subset (e.g., half) of the gateways using standby power to reduce the peak current flowing through the power network (e.g., by half). In some implementations, this has the advantage of reducing IR drop (e.g., by half) and may permit PSSDC power to go deeper in the network by not reserving IR loss due to high peak pulse power demand. For example, a load such as a fiber node or small cell radio may have a 1 amp operational average but may require a transient peak current at 3 amps for some periods of time. For this load, an SSDC gateway having local energy storage (e.g., UPS) can be located, e.g., at 3 times the distance from the non-UPS gateway. In some implementations, a UPS gateway supplements the input power by using stored energy to control the IR drop (to be 1 amp in this example, such that the cable plant IR drop is approximately ⅓ of the IR drop of the non UPS gateway) such that it can be located further away from the load by a corresponding distance.

Figure 8:
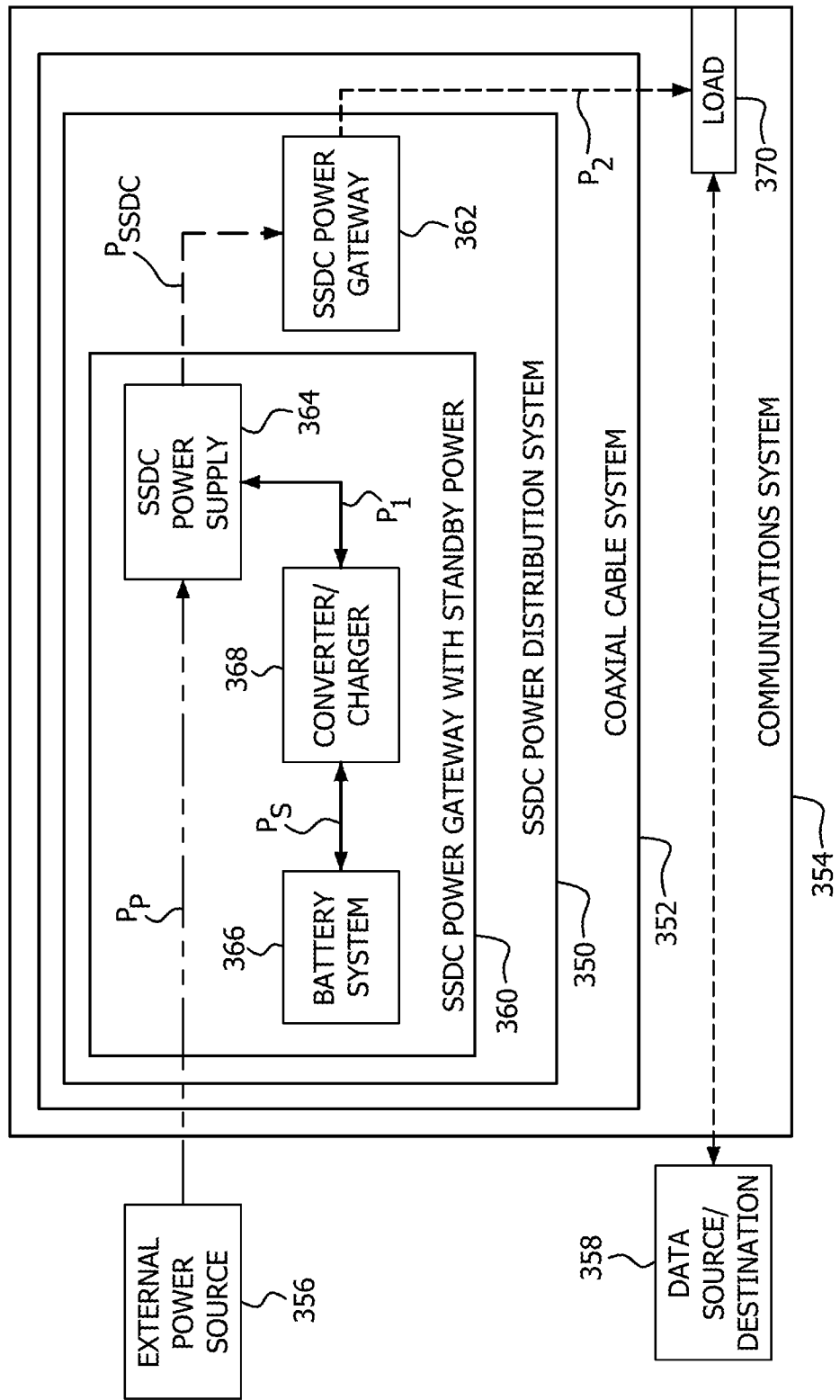
FIG. 8 is a block diagram illustrating an eighth example SSDC power distribution system for providing power from an external power source to a load of a data communications system, where the eighth example coaxial cable power system employs standby power at a power supply level.

FIG. 8 is a block diagram illustrating an eighth example SSDC power distribution system 350. The eighth example SSDC power distribution system 350 is part of a coaxial cable system 352 and is further part of a communications system 354. Power to the eighth example SSDC power distribution system 350 is provided by one or more external power sources 356. The example communications system 354 is configured to communicate data with a data source/destination 358. The data source/destination 358 may be part of or separate from the communications system 354.

The eighth example SSDC power distribution system 350 includes a synchronous switched direct current (SSDC) power supply with standby power 360 and an SSDC power gateway 362. The example SSDC power supply with standby power 360 includes an SSDC power supply 364, an energy storage system such as a battery system 366, and a supply/charger circuit 368. The example communications system 354 includes a load 370. Data is transmitted between the data source/destination 358 and the load 370 through any suitable wireless, wired, and/or fiber optic data transmission system.

The SSDC power supply with standby power 360 is operatively connected to the external power source 356 and to the SSDC power gateway 362. The SSDC power gateway is operatively connected to the load 370. A primary power signal PP is transmitted from the external power source 356 to the SSDC power supply with standby power 360. A secondary power signal PS is transmitted from the SSDC power gateway 362 to the load 370. An SSDC power signal PSSDC is transmitted by the SSDC power supply with standby power 360 to the SSDC power gateway 362 over coaxial cable of the coaxial cable system 352.

The SSDC power supply with standby power 360 is capable of generating the SSDC power signal PSSDC based on one or both of the primary power signal PP and a standby power signal P1 generated by the supply/charger circuit 368. The supply/charger circuit 368 further generates the standby power signal P1 based on a battery power signal P2 available at the battery system 366. The SSDC power signal PSSDC, the standby power signal P1, and the battery power signal P2 may be the same, or one or more of these signals PSSDC, P1, and P2 may be different, in which case a conversion process may be implemented by one or both of the SSDC power supply 364 and the supply/charger circuit 368.

The standby power signal P1 may be used to supply the secondary power signal PS to the load 370 when the primary power signal PP is outside of parameters (e.g., operating outside of its operational range). In addition or instead, the standby power signal P1 would allow the SSDC power supply 364 to implement power averaging that allows the SSDC power gateway 362 and the load 370 connected thereto to operate during short periods of high demand without disrupting normal operation of the SSDC power distribution system 350.

Figure 9:
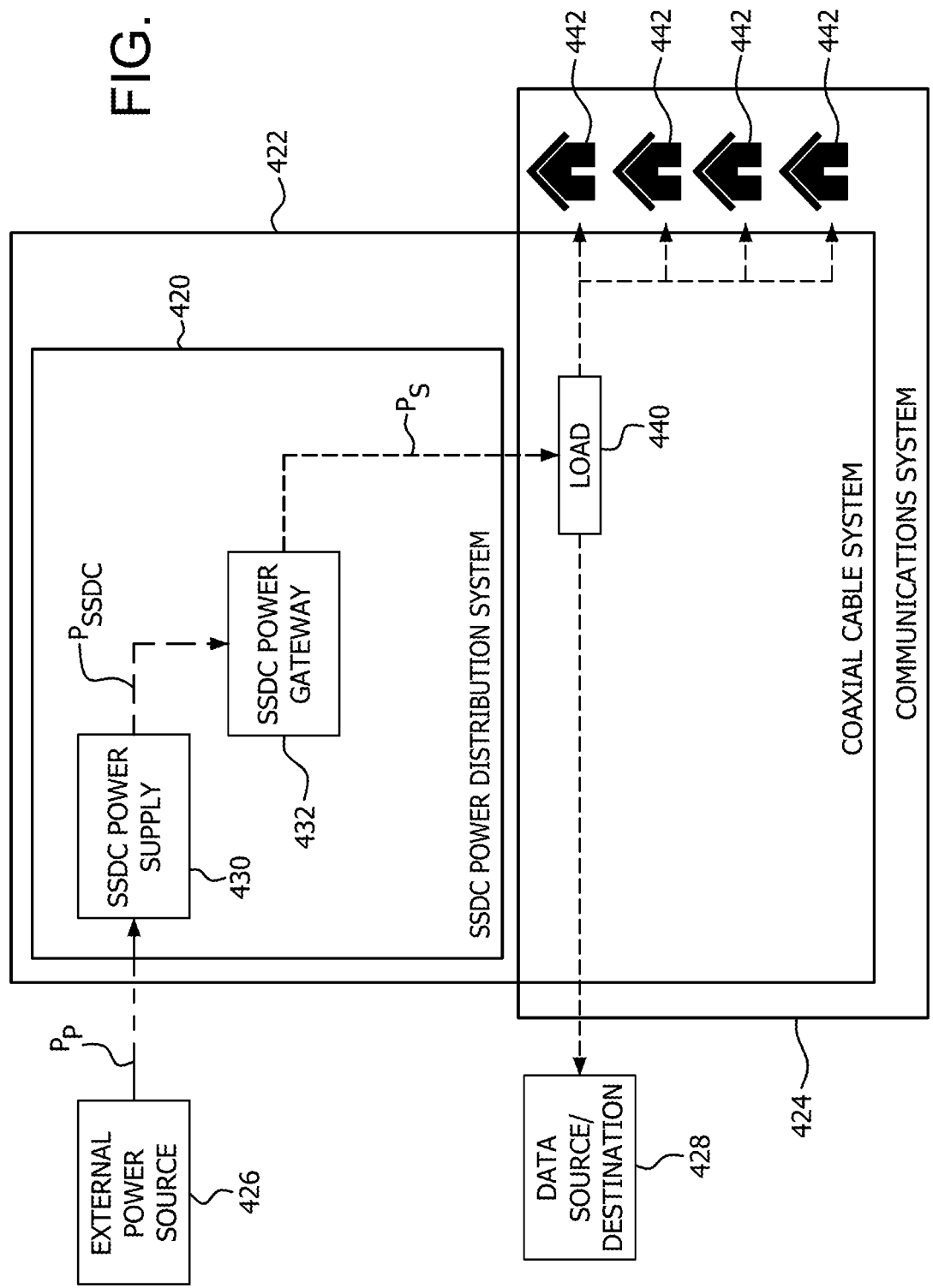
FIG. 9 is a block diagram illustrating a ninth example SSDC power distribution system for providing power from an external power source to a load of a data communications system, where the ninth example coaxial cable power system supplies power to a load in the form of a coaxial cable network device.

FIG. 9 is a block diagram illustrating a ninth example SSDC power distribution system 420. The ninth example SSDC power distribution system 420 is part of a coaxial cable system 422 and is further part of a communications system 424. Power to the ninth example SSDC power distribution system 420 is provided by one or more external power sources 426. The example communications system 424 is configured to communicate data with a data source/destination 428. The data source/destination 428 may be part of or separate from the communications system 424.

The ninth example SSDC power distribution system 420 includes a synchronous switched direct current (SSDC) power supply 430 and an SSDC power gateway 432. The example communications system 424 includes a load 440. The example load 440 is connected to a plurality of subscriber premises 442 by coaxial cable. Data is transmitted between the data source/destination 428 and the load 440 through any suitable wireless, wired, and/or fiber optic data transmission system. Data is transmitted between the load 440 and the subscriber premises 442 by coaxial cable. The example load 440 may be a cable device such as a tap, a fiber optic device such as fiber node, or a wireless networking device.

The SSDC power supply 430 is operatively connected to the external power source 426 and to the SSDC power gateway 432. The SSDC power gateway 432 is operatively connected to the load 440. A primary power signal PP is transmitted from the external power source 426 to the SSDC power supply 430. A secondary power signal PS is transmitted from the SSDC power gateway 432 to the load 440. An SSDC power signal PSSDC is transmitted by the SSDC power supply 430 to the SSDC power gateway 432 over coaxial cable of the coaxial cable system 422.

Figure 10:
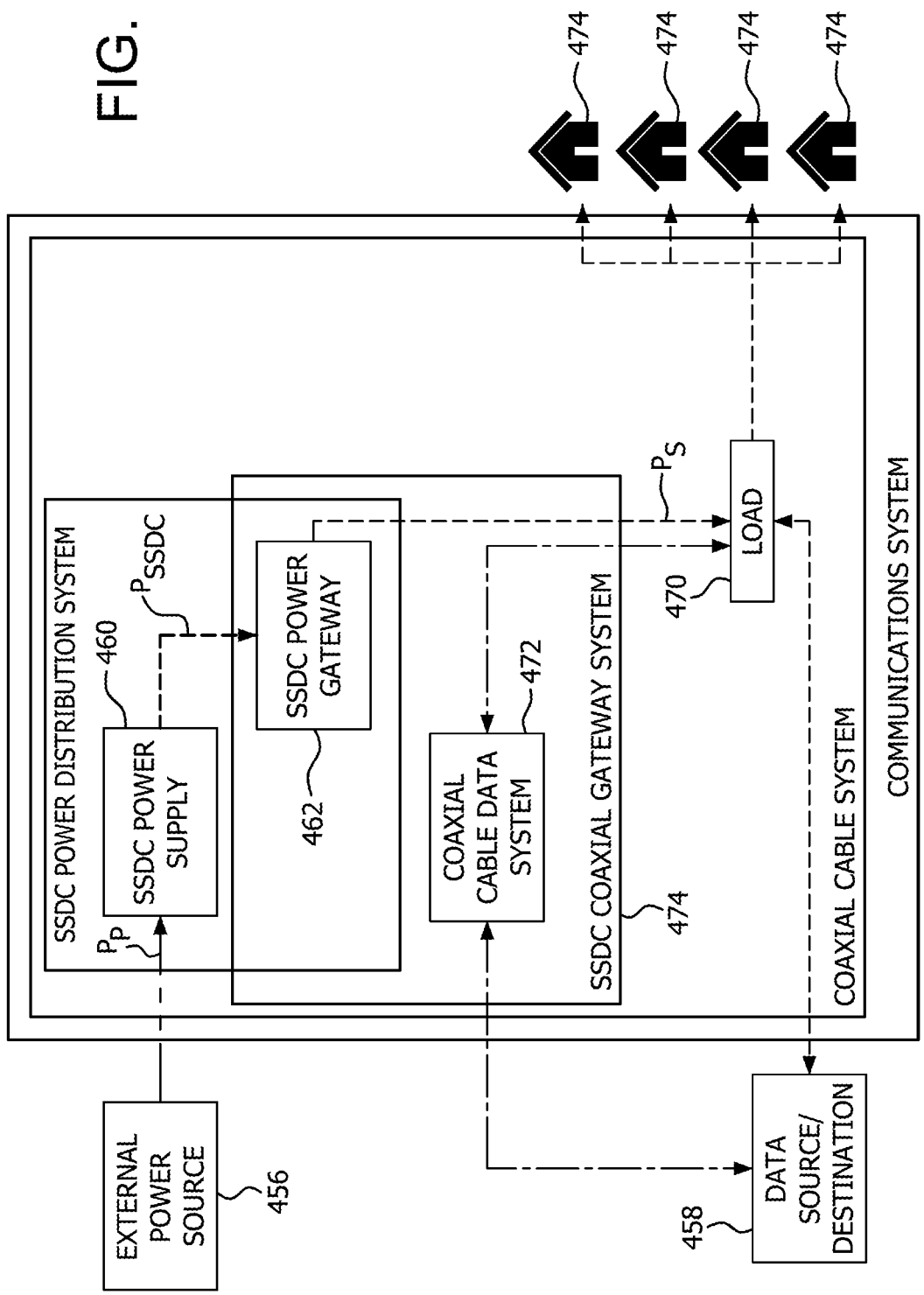
FIG. 10 is a block diagram illustrating a tenth example SSDC power distribution system for providing power from an external power source to a load of a hybrid data communications system, where the tenth example coaxial cable power system a load in the form of a data node.

FIG. 10 is a block diagram illustrating a tenth example SSDC power distribution system 450 constructed in accordance with, and embodying, the principles of the present invention. The tenth example SSDC power distribution system 450 is part of a coaxial cable system 452 and is further part of a communications system 454. Power to the tenth example SSDC power distribution system 450 is provided by one or more external power sources 456. The example communications system 454 is configured to communicate data with a data source/destination 458. The data source/destination 458 may be part of or separate from the communications system 454.

The tenth example SSDC power distribution system 450 includes a synchronous switched direct current (SSDC) power supply 460 and an SSDC power gateway 462. The example communications system 454 includes a load 470 and a coaxial cable data system 472. The example load 470 is connected to a plurality of subscriber premises 474 by coaxial cable. Data is transmitted between the data source/destination 458 and the load 470 through the coaxial cable data system 472 and/or through any suitable wireless, wired, and/or fiber optic data transmission system connecting the data source/destination 458 to the load 470. Data is transmitted between the load 470 and the subscriber premises 474 by coaxial cable. The example load 470 may be a cable device such as a tap, a fiber optic device such as fiber node, a wireless device, or a combination thereof. The example SSDC power gateway 462 and the coaxial cable data system 472 may be separate physical equipment but are typically combined as a SSDC coaxial gateway system 476.

The SSDC power supply 460 is operatively connected to the external power source 456 and to the SSDC power gateway 462. The SSDC power gateway 462 is operatively connected to the load 470. A primary power signal PP is transmitted from the external power source 456 to the SSDC power supply 460. A secondary power signal PS is transmitted from the SSDC power gateway 462 to the load 470. An SSDC power signal PSSDC is transmitted by the SSDC power supply 460 to the SSDC power gateway 462 over coaxial cable of the coaxial cable system 452.

Figure 11:
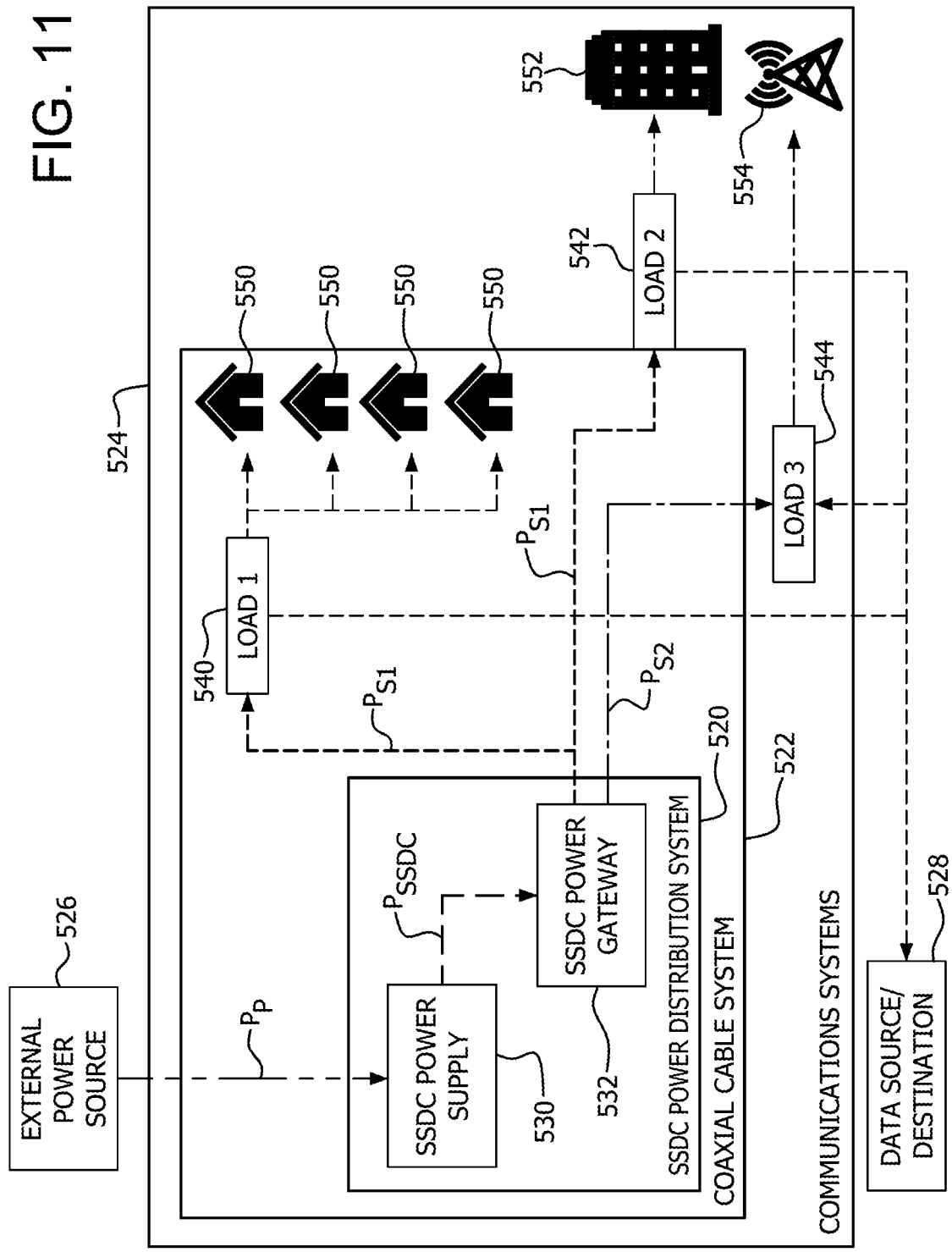
FIG. 11 is a block diagram illustrating an eleventh example SSDC power distribution system for providing power from an external power source to a load of a data communications system, where the eleventh example coaxial cable power system supplies power to multiple loads having at least one power requirements.

FIG. 11 is a block diagram illustrating an eleventh example SSDC power distribution system 520. The eleventh example SSDC power distribution system 520 is part of a coaxial cable system 522 and is further part of a communications system 524. Power to the eleventh example SSDC power distribution system 520 is provided by one or more external power sources 526. The example communications system 524 is configured to communicate data with a data source/destination 528. The data source/destination 528 may be part of or separate from the communications system 524.

The eleventh example SSDC power distribution system 520 includes a synchronous switched direct current (SSDC) power supply 530 and an SSDC power gateway 532. The example communications system 524 includes a first load 540, a second load 542, and a third load 544.

The example first load 540 is connected to subscriber premises 550 by coaxial cable. Data is transmitted between the data source/destination 528 and the load 540 through any suitable wireless, wired, and/or fiber optic data transmission system. Data is transmitted between the first load 540 and the subscribers' premises 550 by coaxial cable. The example first load 540 may be a cable device such as a tap, a fiber optic device such as fiber node, or a wireless device.

The example second load 542 is connected to a commercial facility 552. Data is transmitted between the data source/destination 528 and the facility 552 through any suitable wireless, wired, and/or fiber optic data transmission system. The example second load 542 may be a cable device such as a tap, a fiber optic device such as fiber node, or a wireless device.

The example third load 544 is connected to a wireless transceiver 554 (e.g., 5G cellular). Data is transmitted between the data source/destination 528 and the wireless transceiver 554 through any suitable wireless, wired, and/or fiber optic data transmission system. The example third load 544 may be a cable device such as a tap, a fiber optic device such as fiber node, or a wireless device. In some implementations, the first load 540, second load 542, and third load 544 are all the same type of device. In other implementations, they are different types of devices.

The SSDC power supply 530 is operatively connected to the external power source 526 and to the SSDC power gateway 532. The SSDC power gateway 532 is operatively connected to the first load 540. A primary power signal PP is transmitted from the external power source 526 to the SSDC power supply 530. The SSDC power gateway 532 generates a first secondary power signal PS1 and a second secondary power signal PS2. The first secondary power signal PS1 is transmitted from the SSDC power gateway 532 to the first and second loads 540 and 542. The second secondary power signal PS2 is transmitted from the SSDC power gateway 532 to the third load 544. In some implementations, PS1 and PS2 have different characteristics, such as a different voltage level, or DC vs. AC, etc. An SSDC power signal PSSDC is transmitted by the SSDC power supply 530 to the SSDC power gateway 532 over coaxial cable of the coaxial cable system 522.

The example SSDC power gateway 532 is thus capable of generating multiple different secondary power signals to accommodate the requirements of multiple loads.

Figure 12:
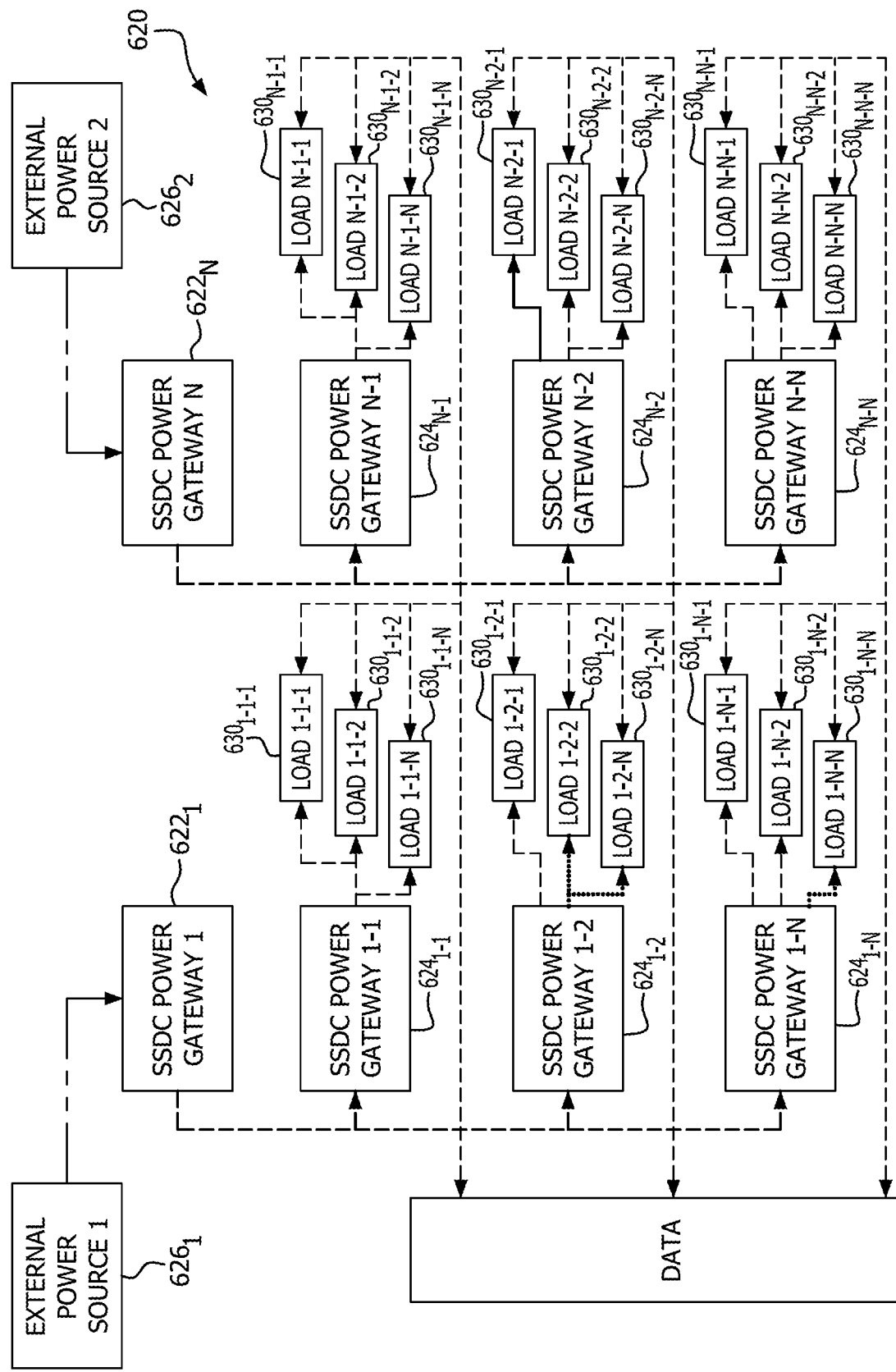
FIG. 12 is a block diagram illustrating a twelfth example SSDC power distribution system for providing power from an external power source to a load of a data communications system, where the eleventh example coaxial cable power system includes multiple power supplies each providing power to multiple power gateways each supplying power to multiple loads having at least one power requirements.

FIG. 12 illustrates an example data communications system 620 including a plurality of SSDC power supplies 622. Each of the SSDC power supplies 622 is connected to a plurality of SSDC power gateways 624. In the example depicted in FIG. 12, each of the SSDC power supplies 622 obtains power from at least one external power source 626. The data communications system 620 includes or is operatively connected to a data source/destination 628. Each of the SSDC power gateways 624 is operatively connected to one or more loads 630. The SSDC power supplies 622 and SSDC power gateways 624 form a SSDC power distribution system.

The external power sources 626 may be or include one or more of a utility power source, a standby power source (e.g., battery or generator), or a renewable power source (e.g., solar panel or wind turbine generator). All of the SSDC power supplies 622 may be connected to the same external power source 626.

The SSDC power supplies 622 are operatively connected to at least one external power source 626 and to at least one of the SSDC power gateways 624. The SSDC power gateways 624 are operatively connected to one or more loads 630. A primary power signal PP is transmitted from one or more of the external power sources 626 to each of the SSDC power supplies 622. The SSDC power gateways 624 generate at least one secondary power signal. Each secondary power signal is transmitted from one of the SSDC power gateways 624 to one of the loads 630. As shown by different configurations of dotted lines connected between the SSDC power gateways 624 and the loads 630, the SSDC power gateways 624 are capable of generating one or more secondary power signals as appropriate for the combination of loads 630 operatively connected thereto.

Figure 13:
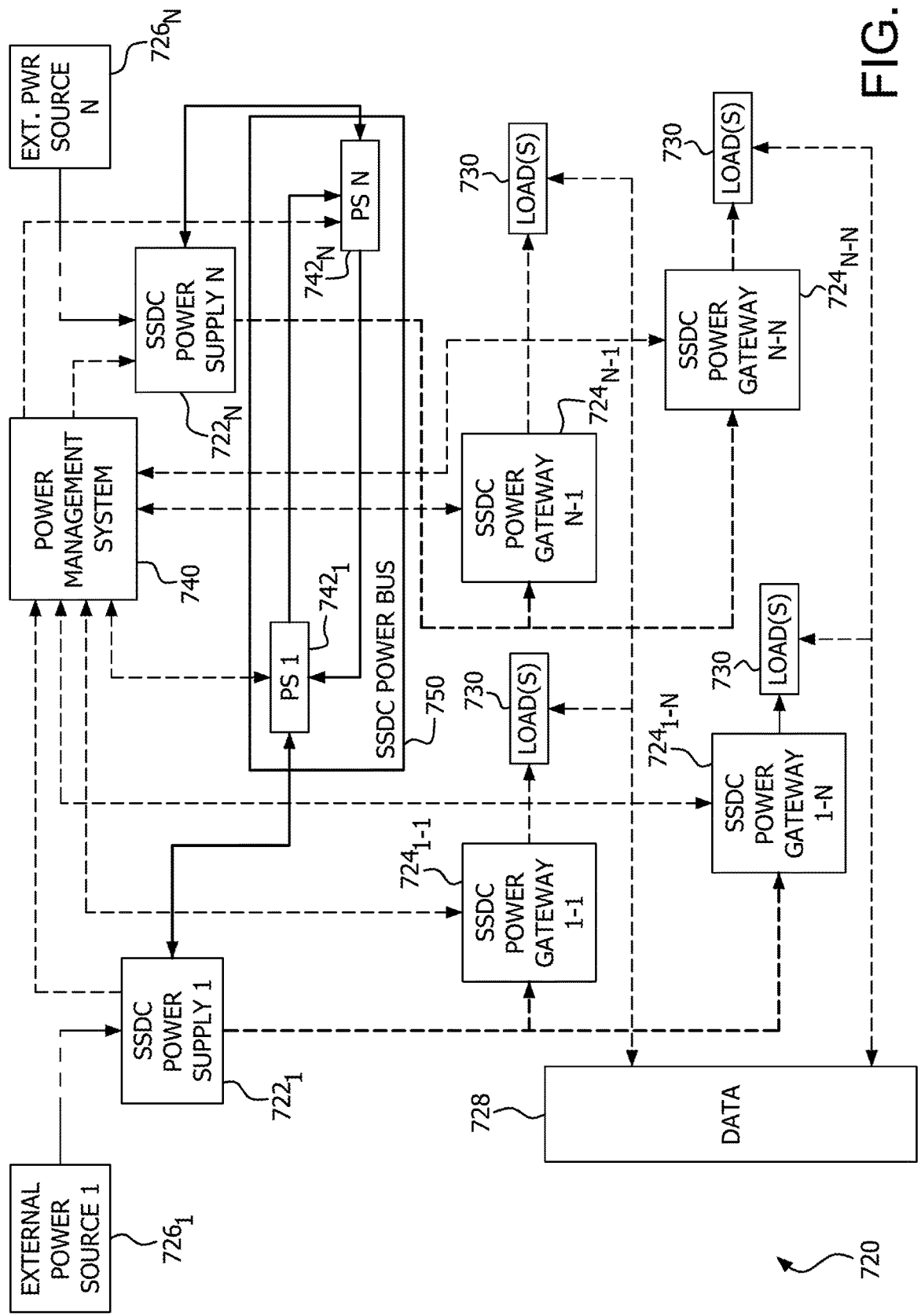
FIG. 13 is a block diagram illustrating a thirteenth example SSDC power distribution system for providing power from an external power source to a load of a data communications system, where the eleventh example coaxial cable power system includes multiple power supplies each providing power to at least one power gateway configured to supply power to at least one load, and where the multiple power supplies are connected to form a power bus controlled by a power management system.

FIG. 13 is a block diagram illustrating an example data communications system 720 including a plurality of SSDC power supplies 722. Each of the SSDC power supplies 722 is connected to a plurality of SSDC power gateways 724. In the example depicted in FIG. 12, each of the SSDC power supplies 722 obtains power from at least one external power source 726. The data communications system 720 includes or is operatively connected to a data source/destination 728. Each of the SSDC power gateways 724 is operatively connected to one or more loads 730. The SSDC power supplies 722 and SSDC power gateways 724 form a SSDC power distribution system.

The external power sources 726 may be or include one or more of a utility power source, a standby power source (e.g., battery or generator), or a renewable power source (e.g., solar panel or wind turbine generator). All of the SSDC power supplies 722 may be connected to the same external power source 726.

The SSDC power supplies 722 are operatively connected to at least one external power source 726 and to at least one of the SSDC power gateways 724. The SSDC power gateways 724 are operatively connected to one or more loads 730. A primary power signal PP is transmitted from one or more of the external power sources 726 to each of the SSDC power supplies 722. The SSDC power gateways 724 generate at least one secondary power signal. Each secondary power signal is transmitted from one of the SSDC power gateways 724 to one of the loads 730. The SSDC power gateways 624 are capable of generating one or more secondary power signals as appropriate for the load 630 or loads 630 operatively connected thereto.

FIG. 13 further illustrates wherein the example data communication system 720 includes a power management device 740 and power switches 742. The power switches 742 interconnect the SSDC power supplies 722 to form a SSDC power bus 750. In some implementations, all of the power switches 742 will normally be operated to connect all of the SSDC power supplies 722 to form the SSDC power bus 750. In some implementations, if the primary SSDC power source is compromised, (e.g., fails, or otherwise operates outside of its nominal performance range in some implementations), the power management device 740 may operate the power switches 742 to redirect the output of one or more of the SSDC power supplies 722 from the SSDC power bus 750 to keep the network power uninterrupted. The power switches 742 and the SSDC power bus 750 formed thereby thus allows the power management device 740 to isolate faults and/or prioritize certain loads 730 forming part of the data communications system 720.

In some implementations, an SSDC power bus is usable with any of the example SSDC power distribution systems of the present invention to yield a software defined, adaptable power network for a communications system. In some implementations, advantageous uses of power switches 742 and SSDC power bus 750 may include providing fault isolation, facility for embedded wireless AP gateways, capability to reroute power from multiple parallel-able power supplies on the network, providing additional N+1 architecture with power supplies in additional to power modules, optimizing reserved power to critical locations, optimizing power plant Time of Use based on locations and local weather conditions, and/or enabling a Software Defined Communication Power Network.

Figure 14:
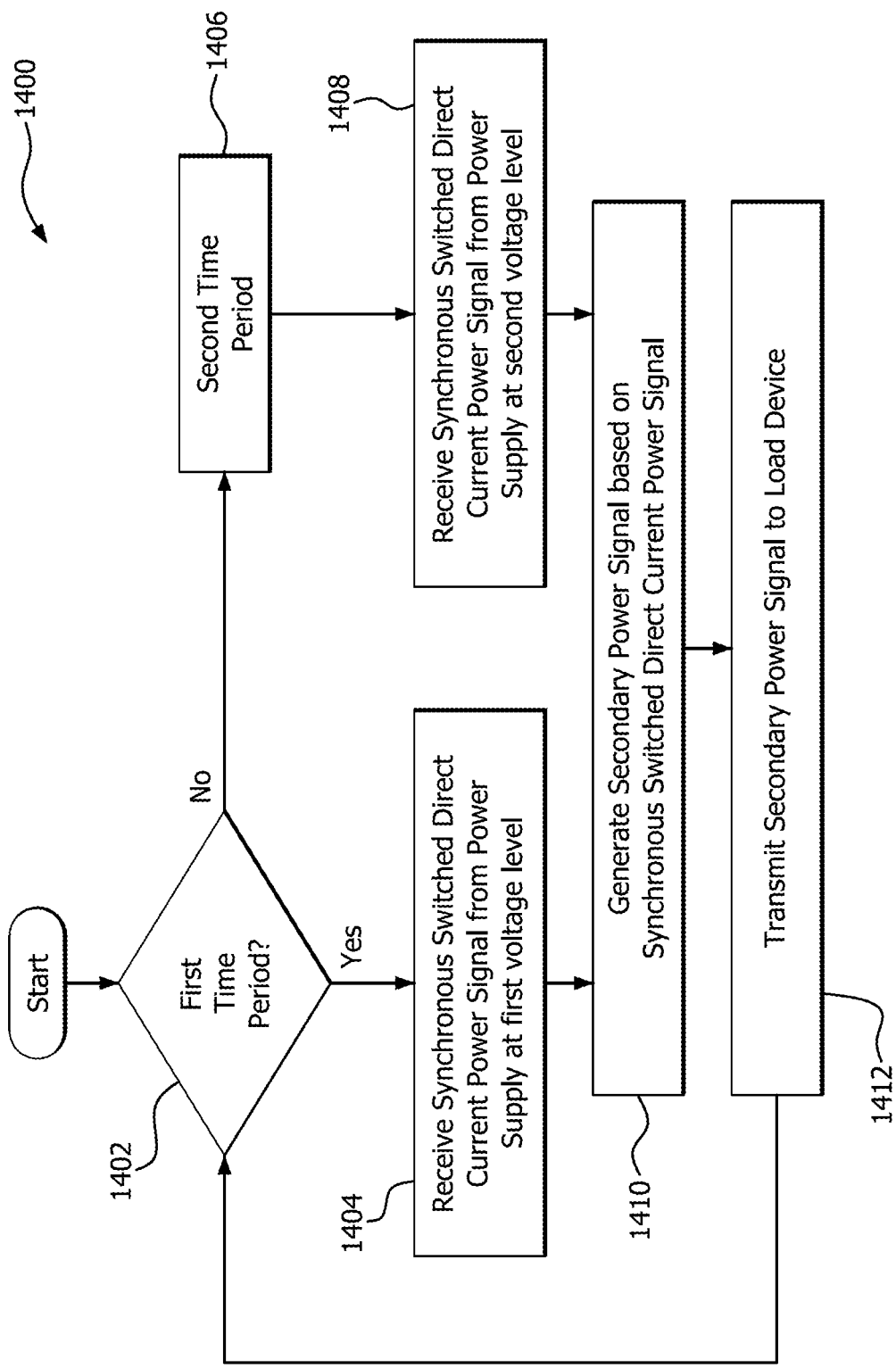
FIG. 14 is a flow chart illustrating an example method implemented in a power gateway.

FIG. 14 is a flow chart illustrating an example method 1400 implemented in a power gateway for providing power to a load device based on a synchronous switched direct current power signal received from a power source over a coaxial cable. The power gateway, load device, power source, and synchronous switched direct current power signal may be implemented in any suitable manner, such as those further described herein.

On a condition 1402 that the power gateway is receiving a synchronous switched direct current power signal from a power source over a coaxial cable during a first period, the power gateway receives the signal at a first voltage level in step 1404. Otherwise, the power gateway is receiving during a second period as indicated by step 1406, and receives the synchronous switched direct current power signal from the power source over the coaxial cable at the second voltage level in step 1408. The first period, second period, first voltage level and the second voltage level, may be determined and/or set in any suitable manner, such as those further described herein.

In either case, the power gateway generates a secondary power signal based on the synchronous switched direct current power signal in step 1410, and transmits the secondary power signal to the load device in step 1412. The power gateway may be generated and/or transmitted to the load device in any suitable manner, such as those further described herein.

It should be understood that many variations are possible based on the disclosure herein. Although features and elements are described above in particular combinations, each feature or element can be used alone without the other features and elements or in various combinations with or without other features and elements.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and
a load device operatively connected to the power gateway and configured to receive the secondary power signal from the power gateway;
wherein the power supply generates the switched direct current power signal at a positive direct current voltage level for a first portion of a time period and at a negative direct current voltage level for a second portion of the time period.

2. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and
a load device operatively connected to the power gateway and configured to receive the secondary power signal from the power gateway;
wherein the power supply generates the switched direct current power signal at a first direct current voltage level for a first portion of a time period and at a second direct current voltage level for a second portion of the time period.

3. The coaxial cable transmission system of claim 2, wherein the first direct current voltage level and the second direct current voltage level are optimized for energy density in view of at least one constraint.

4. The coaxial cable transmission system of claim 3, wherein the constraint comprises a network topology or a voltage limit.

5. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and
a load device operatively connected to the power gateway and configured to receive the secondary power signal from the power gateway;
wherein the switched direct current power signal is optimized to avoid corrosion of the coaxial cable.

6. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and a load device operatively connected to the power gateway and configured to receive the secondary power signal from the power gateway;
wherein the power supply switches the switched direct current power signal between a first direct current voltage level and a second direct current voltage level based on a predetermined schedule.

7. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and
a load device operatively connected to the power gateway and configured to receive the secondary power signal from the power gateway;
wherein the power supply and the power gateway are synchronized such that the power gateway adapts to a change in the switched direct current power signal; and
wherein the power gateway adapts to the change in the switched direct current power signal from a first voltage to a second voltage in response to a synchronization signal.

8. The coaxial cable transmission system of claim 7, wherein the power gateway receives the synchronization signal from another power supply.

9. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and
a load device operatively connected to the power gateway and configured to receive the secondary power signal from the power gateway;
wherein the power supply switches the switched direct current power signal between a first direct current voltage level and a second direct current voltage level based on a synchronization signal.

10. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal; and
a load device operatively connected to the power gateway and configured to receive the secondary power signal from the power gateway;
wherein the switched direct current power signal comprises a periodic, non-sinusoidal waveform, a pulse wave, and/or has a duty cycle of 50%.

11. A coaxial cable transmission system comprising:
a power supply operatively connected to a coaxial cable and configured to receive a primary power signal from a power source and to generate a switched direct current power signal from the primary power signal;
a power gateway operatively connected to the coaxial cable and configured to receive the switched direct current power signal over the coaxial cable from the power supply and to generate a secondary power signal from the switched direct current power signal;
a load device operatively connected to the power gateway and configured to receive the secondary power signal from the power gateway;
a power management device; and
a second power supply;
wherein the power management device is configured to direct the switched direct current power signal from the power supply to the second power supply responsive to a fault in the second power supply.

12. The coaxial cable transmission system of claim 11, further comprising a power bus, wherein the power supply and the second power supply are operatively connected to the power bus, and wherein the power management device is configured to direct the switched direct current power signal from the power supply to the second power supply over the power bus responsive to the fault in the second power supply.

13. The coaxial cable transmission system of claim 11, further comprising a second load device operatively connected to the second power supply, wherein the power management device is configured to direct the switched direct current power signal from the power supply to the second load device responsive to the fault in the second power supply.

14. A power gateway device comprising:
circuitry configured to receive a synchronous switched direct current power signal over a coaxial cable from a power supply;
circuitry configured to generate a secondary power signal from the synchronous switched direct current power signal; and
circuitry configured to transmit the secondary power signal to a load device;
wherein the power gateway device receives the switched direct current power signal at a first direct current voltage level for a first portion of a time period and receives the switched direct current power signal at a second direct current voltage level for a second portion of the time period.

15. The power gateway device of claim 14, wherein the first direct current voltage level, the first portion of the time period, the second direct current voltage level, and the second portion of the time period, are optimized to avoid corrosion of the coaxial cable.

16. A method implemented in a power gateway device, the method comprising:
receiving a synchronous switched direct current power signal over a coaxial cable from a power supply;
generating a secondary power signal based on the synchronous switched direct current power signal;
transmitting the secondary power signal to a load device;
receiving the switched direct current power signal at a first direct current voltage level for a first portion of a time period; and
receiving the switched direct current power signal at a second direct current voltage level for a second portion of the time period;

wherein the first direct current voltage level, the first portion of the time period, the second direct current voltage level, and the second portion of the time period, are set to avoid corrosion of the coaxial cable.

\* \* \* \* \*